United States Patent
Itoh et al.

(10) Patent No.: US 9,926,140 B2
(45) Date of Patent: Mar. 27, 2018

(54) ROLLER CONVEYOR DEVICE, CONTROLLER, AND MECHANICAL DEVICE ABNORMALITY DETECTION METHOD

(71) Applicant: ITOH DENKI CO., LTD., Kasai-shi, Hyogo (JP)

(72) Inventors: Kazuo Itoh, Kasai (JP); Toshiyuki Tachibana, Himeji (JP); Yoshinori Nagai, Kakogawa (JP); Shinji Sayama, Kakogawa (JP)

(73) Assignee: Itoh Denki Co., Ltd. (JP)

( * ) Notice: Subject to any disclaimer, the term of this patent is extended or adjusted under 35 U.S.C. 154(b) by 96 days.

(21) Appl. No.: 14/786,409

(22) PCT Filed: Apr. 30, 2014

(86) PCT No.: PCT/JP2014/061971
§ 371 (c)(1),
(2) Date: Oct. 22, 2015

(87) PCT Pub. No.: WO2014/178399
PCT Pub. Date: Nov. 6, 2014

(65) Prior Publication Data
US 2016/0075518 A1  Mar. 17, 2016

(30) Foreign Application Priority Data

Apr. 30, 2013  (JP) .................................. 2013-095152

(51) Int. Cl.
*B65G 23/08* (2006.01)
*B65G 13/06* (2006.01)
(Continued)

(52) U.S. Cl.
CPC ............. *B65G 23/08* (2013.01); *B65G 43/00* (2013.01); *G01M 99/00* (2013.01); *H02P 6/12* (2013.01); *G01D 5/145* (2013.01)

(58) Field of Classification Search
None
See application file for complete search history.

(56) References Cited

U.S. PATENT DOCUMENTS 3,803,466 A  *  4/1974  Starkey .................. B60L 15/005
                                                   104/292
6,820,736 B2 * 11/2004  Itoh ........................ B65G 39/02
                                                   198/780
(Continued)

FOREIGN PATENT DOCUMENTS

JP  09110252 A  * 10/1995 ............. B65H 23/26
JP  09110252 A  *  4/1997
(Continued)

OTHER PUBLICATIONS

International Search Report for PCT/JP2014/061971, dated Jul. 8, 2014.
(Continued)

*Primary Examiner* — Kavel Singh
(74) *Attorney, Agent, or Firm* — Wood, Phillips, Katz, Clark & Mortimer

(57) ABSTRACT

There is provided a roller conveyor that has a function capable of specifying a failure part or a defective part. When a signal for executing a failure detection operation is transmitted from a host controller (50) to each zone controller (10), each zone controller (10) immediately activates the corresponding motor-incorporating roller (5a). Then, after a certain time, the motor-incorporating roller (5a) is stopped. A pulse interval thereafter is detected by a pulse interval monitoring program (36) to determine whether a delay phenomenon has occurred. The delay phenomenon is a phenomenon in which the pulse signal generation interval is temporarily extended.

19 Claims, 16 Drawing Sheets

(51) Int. Cl.
  *B65G 43/00* (2006.01)
  *G01M 99/00* (2011.01)
  *H02P 6/12* (2006.01)
  *G01D 5/14* (2006.01)

(56) References Cited

U.S. PATENT DOCUMENTS

2003/0209410 A1    11/2003   Itoh et al.
2006/0132077 A1     6/2006   Itoh et al.
2012/0048682 A1     3/2012   Itoh et al.

FOREIGN PATENT DOCUMENTS

| JP | 2003-250289 A | 4/1999 |
| JP | 2006-168920 A | 12/2004 |
| JP | 2008-259406 A | 10/2008 |
| JP | 2009-143704 A | 7/2009 |
| JP | 2012-71988 A | 4/2012 |

OTHER PUBLICATIONS

International Preliminary Report on Patentability and Written Opinion, dated Nov. 12, 2015, in PCT/JP2014/061971.

\* cited by examiner

ROLLER CONVEYOR DEVICE, CONTROLLER, AND MECHANICAL DEVICE ABNORMALITY DETECTION METHOD

TECHNICAL FIELD

The present invention relates to a roller conveyor having a failure diagnosis function. The present invention further relates to a controller used in, for example, a conveyor. The present invention further relates to a method for detecting abnormality of, for example, a conveyor.

BACKGROUND ART

Many roller conveyors that use motor-incorporating rollers are used in factories and distribution warehouses. The motor-incorporating roller includes a roller body, a motor, and a reduction gear, the motor and the reduction gear being incorporated in the roller body. The roller body is rotated by driving the motor. There is a motor-incorporating roller provided with no reduction gear.

In a typical roller conveyor that uses a motor-incorporating roller, the motor-incorporating roller and an idling roller are attached to a frame which is provided with members arranged in parallel to each other, and, for example, a belt is wound around the motor-incorporating roller and the idling roller.

In the above roller conveyor, power supply to the motor-incorporating in the motor-incorporating roller causes rotation of the roller body of the motor-incorporating roller. The rotation is transmitted to the idling roller by the belt to rotate all the rollers attached to the frame to thereby convey a conveyance object.

In recent years, there has been used a roller conveyor in which a conveyance line is divided into a plurality of control zones. A control system when a roller conveyor is divided into a plurality of zones is referred to as decentralized control.

A roller conveyor that employs decentralized control does not allow the entire roller conveyor to integrally operate, but allows a motor-incorporating roller to rotate in each control zone to convey a conveyance object. Thus, the roller conveyor that employs decentralized control has less wasteful rotation of the motor-incorporating roller and thus has cost effectiveness. Further, dividing a range for control into small ranges eliminates the necessity of a complicated control system.

On the other hand, however, in the roller conveyor that has a plurality of control zones, the frequency of starting and stopping the motor-incorporating rollers is high. Thus, a gear, a belt, and a metal fitting which fixes the motor-incorporating roller to the frame are likely to be worn.

In particular, when the metal fitting which fixes the motor-incorporating roller to the frame is worn and a fixed shaft of the motor-incorporating roller rotates relative to the frame, for example, an electric supply line which allows the inside and the outside of the motor-incorporating roller to connect with each other is twisted off, which causes an unusable state of the motor-incorporating roller. Thus, when the fixed shaft of the motor-incorporating roller rotates relative to the frame, the conveyor is forced to stop for a long time.

Thus, maintenance of the roller conveyor is important. However, determination of the degree of wear of each consumable article largely depends on determination by human such as rule of thumb, calculation from an introduction time, determination by touching with hand, and determination based on sound or smell, and is thus not easy.

Patent Document 1 discloses an equipment diagnosis method capable of easily determining replacement time of a consumable member in a device such as a motor (electric motor). In the equipment diagnosis method disclosed in Patent Document 1, a current value of the motor in no-load running when the device is in a sound state is compared with a current value of the motor in a no-load running during operation, and the replacement time is determined based on a difference between the current values.

Patent Document 2 discloses a method for performing failure diagnosis by previously storing a profile of the relationship between current and time when a conveyor normally functions as reference information and comparing a current profile with the stored profile.

CITATION LIST

Patent Documents

Patent Document 1: JP 2009-143704 A
Patent Document 2: JP 2012-71988 A

DISCLOSURE OF INVENTION

Technical Problem

The equipment diagnosis method disclosed in Patent Document 1 merely compares current values of the motor in no-load running between a sound state and an operating state. Thus, even when replacement time of a consumable article is determined, which component in the device should be replaced is not clear. Therefore, it is necessary to sequentially check components inside the device, which is a time-consuming job.

In the equipment diagnosis method disclosed in Patent Document 2, it is necessary to acquire a profile of the relationship between current and time when the roller conveyor normally functions and acquire the reference information in a construction site of the roller conveyor. Thus, an operation by a specialized constructor is required and the versatility is thus low.

The present invention focuses on the above problems in conventional technologies and aims to develop a roller conveyor capable of easily specifying a failure part or a defective part and eliminating the necessity of an operation for acquiring reference information. In particular, the present invention aims to develop a roller conveyor capable of detecting the presence or absence of looseness or backlash in an attachment part of a motor-incorporating roller.

Further, the present invention aims to develop a controller capable of solving the above problems.

Further, the present invention aims to develop a method for detecting abnormality of a machine device capable of solving the above problems.

Solution to Problem

The present inventors have made earnest studies to solve the above problems and found that a characteristic change occurs in a motor pulse signal generated based on a signal generated by a motor-incorporating roller when looseness is generated in a metal fitting of the motor-incorporating roller.

A brushless motor detects the rotation position of a rotor by a detection unit such as a Hall element. Then, a signal generated by the Hall element is taken out to the outside, and current to be supplied to a stator of a motor inside thereof is switched in accordance with the signal.

The inventors have generated pulse signals from signals generated by, for example, the Hall element and observed intervals of the pulse signals.

When the roller conveyor is in a stopped state, no pulse signal is, of course, generated. When the roller conveyor is rotated, the Hall element generates a signal and a pulse signal is thereby generated. Then, the pulse signal interval is shortened along with an increase in the rotation speed of the motor-incorporating roller. Then, the pulse signal interval is stabilized after a certain time passes.

When the currently driven roller conveyor is stopped, the pulse signal interval is gradually extended. When the rotation of the motor-incorporating roller completely stops, a signal from the Hall element is stopped. Accordingly, no pulse signal is generated. That is, when the roller conveyor is stopped, the pulse signal interval is gradually extended, and finally becomes infinite.

On the other hand, when there is looseness in a metal fitting of the motor-incorporating roller, a characteristic phenomenon in which an interval of motor pulses generated by the motor-incorporating roller is temporarily extended, an interval of pulse signals is then shortened, and the motor-incorporating roller then comes to a stop occurs.

One aspect of the present invention has been developed based on the above findings and provides a roller conveyor including a frame; a plurality of rollers attached to the frame, at least one of the rollers being a motor-incorporating roller including a roller body and a motor therein; a pulse signal generation unit that generates a pulse signal in accordance with rotation of a rotor of the motor-incorporating roller; and a delay phenomenon detection function of detecting a pulse signal interval when the rotation of the motor-incorporating roller is stopped and detecting occurrence of a delay phenomenon in which the pulse signal interval becomes a certain interval or more before the motor-incorporating roller comes to stop.

Any part of a pulse signal is used as a reference to detect "a pulse signal interval". A generation interval of pulses, an interval between the centers of pulses, an interval between the ends of pulse signals, or a switching interval of pulses may be detected. That is, a time from a rise time of one pulse up to a rise time of the next pulse (a pulse generation interval) may be defined as "the pulse signal interval". Alternatively, a time from a fall time or a disappearance time of one pulse up to a fall time or a disappearance time of the next pulse (a pulse disappearance interval) may be defined as "the pulse signal interval". Alternatively, a time from a fall time or a disappearance time of one pulse up to a rise time of the next pulse (a pulse one-side switching interval) may be defined as "the pulse signal interval". Alternatively, a time from a rise time of one pulse up to a fall time of the next pulse (a pulse one-side switching interval) may be defined as "the pulse signal interval".

Further, a time from a fall time or a rise time of one pulse up to a rise time or a fall time of another pulse (a pulse reciprocation switching time) may be defined as "the pulse signal interval".

Further, "the pulse reciprocation switching interval" is detected based on both the rise and the fall of a pulse. Thus, the number of detected intervals is twice the number of generated pulses. In the other methods, the number of detected intervals is equal to the number of generated pulses (strictly, minus one).

When the delay phenomenon is detected by the delay phenomenon detection function, looseness in an attachment region of the motor-incorporating roller is suspected.

Desirably, the roller conveyer monitors the pulse signal interval until the number of the generated pulse signal interval reaches the number smaller than the number of the pulse interval generated before the pulse signal stops by three or more to determine whether the delay phenomenon has occurred during the monitored period.

Desirably, the roller conveyer monitors the pulse signal interval until the number of the generated pulse signal interval reaches the number smaller than the number of the pulse interval generated before the pulse signal stops by a predetermined number to determine whether the delay phenomenon has occurred during the monitored period.

Desirably, the roller conveyer monitors the pulse signal interval until the number of the generated pulse signal intervals reaches a certain number after energization to the motor-incorporating roller is stopped to determine whether the delay phenomenon has occurred during the monitored period.

Desirably, the roller conveyor further includes a characteristic phenomenon detection function of detecting occurrence of a characteristic phenomenon in which the pulse signal temporarily extends the interval and then shortens the interval, and then comes to stop of generation.

When the characteristic phenomenon is detected by the characteristic phenomenon detection function, looseness in the attachment region of the motor-incorporating roller is more highly suspected.

Desirably, the roller conveyor is divided into a plurality of control zones, one or a plurality of the motor-incorporating rollers are provided in each of the control zones, and the roller conveyor includes a controller for controlling the motor-incorporating rollers of each of the control zones or a plurality of the control zones.

The roller conveyor of this aspect employs decentralized control.

Desirably, the roller conveyor further includes a plurality of controllers and a host controller for the controllers, wherein information about the pulse signal interval is transmitted from each of the controllers to the host controller in accordance with an instruction of the host controller.

In this aspect, since the failure diagnosis is performed in accordance with an instruction of the host controller, the working efficiency is high.

Desirably, the controller includes an interval detection unit that detects the pulse signal interval and a selection unit that selects a maximum one of the pulse intervals detected by the interval detection unit, and information about the maximum interval is transmitted to a host controller to determine whether the delay phenomenon has occurred in the host controller.

In this aspect, the maximum pulse interval is selected by the controller, and whether the delay phenomenon has occurred is determined by the host controller on the basis of the information. Thus, the processing amount executed by the host controller is small. Accordingly, even when a host controller having a relatively low ability is used, the failure diagnosis can be performed.

Desirably, the roller conveyor further includes an alarm unit that notifies generation of looseness in attachment of the motor-incorporating roller to the frame on the condition that the delay phenomenon has occurred.

The roller conveyor in this aspect is capable of notifying the generation of looseness in the attachment of the motor-incorporating roller to the frame by the alarm unit.

Desirably, an alarm content of the alarm unit changes depending on the degree of the delay phenomenon.

Desirably, the roller conveyer includes the delay phenomenon detection function that detects a switching interval from a rise or a fall of any pulse signal to a rise or a fall of another pulse signal as the pulse signal interval to detect occurrence of the delay phenomenon in which the pulse signal switching interval becomes a certain interval or more before the motor-incorporating roller comes to stop.

In this aspect, the pulse reciprocation switching interval is employed as "the pulse signal interval". In the present invention, the number of "pulse signal intervals" detected while the motor-incorporating roller makes one rotation is large. Thus, it is possible to quickly detect the occurrence of the delay phenomenon.

Desirably, whether the delay phenomenon has occurred is determined by comparing any pulse signal interval nw with an immediately preceding pulse signal interval mw and by determining whether a difference between the pulse signal interval nw and the immediately preceding pulse signal interval mw is equal to or more than a threshold TS, and when the motor-incorporating roller is rotated on the condition that there is no looseness in attachment of the motor-incorporating roller and a pulse signal interval immediately before power supply to the motor-incorporating roller is stopped is defined as a reference interval ts, the threshold TS is three to ten times the reference interval ts.

Desirably, the rotor of the motor-incorporating roller has a permanent magnet and a plurality of poles, the roller conveyor includes a plurality of signal generation units that detects approach/departure of the poles to generate a signal, several of the signal generation units simultaneously generating signals when the motor rotates and a pulse generation circuit that generates a pulse corresponding to each of the signal generation units in accordance with a signal corresponding to each of the signal generation units, and the roller conveyor detects the pulse signal interval without distinguishing which of the signal generation units generates the pulse signal interval.

An essential part of the present invention may also be applied to a controller.

The invention relating to a controller provides a controller for controlling a motor-incorporating roller having a roller body and a brushless motor therein, the brushless motor including a signal generation unit that generates a signal in accordance with a rotation position of a rotor so as for the controller to switch current to be supplied to a stator of the brushless motor in accordance with the signal, the controller including a pulse generation circuit that generates a pulse in accordance with a signal generated by the signal generation unit, an interval detection unit that detects an interval of pulse signals generated by the pulse generation circuit, a selection unit that selects the maximum one of the pulse intervals detected by the interval detection unit, and a transmission unit that transmits information about the maximum interval to the outside.

The invention relating to a method for detecting abnormality of a machine device provides a method for detecting abnormality of a machine, the machine using a motor-incorporating roller including a roller body and a motor therein, the motor-incorporating roller rotating the roller body by rotation of the motor, the method including generating a pulse signal in accordance with rotation of the motor in the motor-incorporating roller, detecting a pulse signal interval when rotation of the motor-incorporating roller is stopped, and determining abnormality of the machine on the condition that the pulse signal interval becomes a certain interval or more before the motor-incorporating roller comes to stop.

Effect of Invention

The roller conveyor, the conveyor controller, and the method for detecting abnormality of a machine device of the present invention enable looseness in attachment of a motor-incorporating roller to a frame to be detected.

DESCRIPTION OF EMBODIMENT

Hereinbelow, a roller conveyor 1 of an embodiment of the present invention will be further described.

The roller conveyor 1 of the present embodiment employs a control system called decentralized control. The roller conveyor 1 is divided into a plurality of control zones and capable of conveying a conveyance object from a zone on the upstream side to a zone on the downstream side. That is, the roller conveyor 1 of the present embodiment has a conveyance function by decentralized control.

The roller conveyor 1 of the present embodiment has, in addition to the conveyance function, a failure diagnosis function of detecting the presence or absence of looseness or backlash in an attachment part of a motor-incorporating roller.

First, the mechanical configuration and the conveyance function by decentralized control of the roller conveyor 1 will be described.

Figure 1:
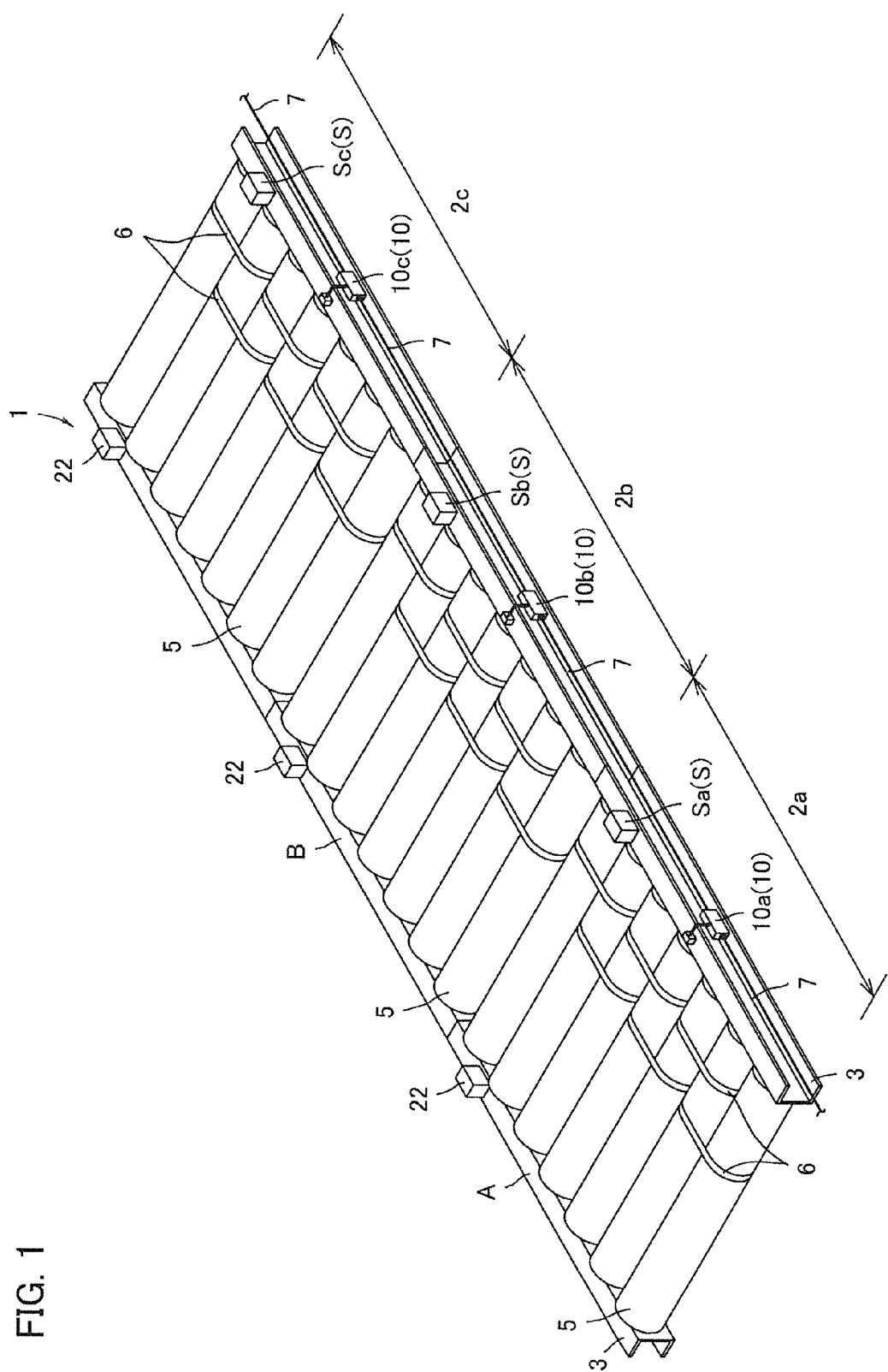
FIG. 1 is a perspective view illustrating a conveyor according to an embodiment of the present invention.

As illustrated in FIG. 1, the roller conveyor 1 includes a plurality of zone conveyors 2 (2a, 2b, 2c . . . ) which are arranged in series in a conveyance direction. Each of the zone conveyors 2 (2a, 2b, 2c . . . ) mainly includes conveying rollers 5, a load presence sensor S (Sa, Sb, Sc . . . ), and a zone controller 10 (10a, 10b, 10c . . . ). Each roller conveyor 1 has the conveyance function. The zone conveyors 2 (2a, 2b, 2c, 2d . . . ) have the same mechanical structure and the same size. Thus, the structure of the zone conveyor 2b illustrated on the center in the drawing will be described as a representative.

Figure 2:
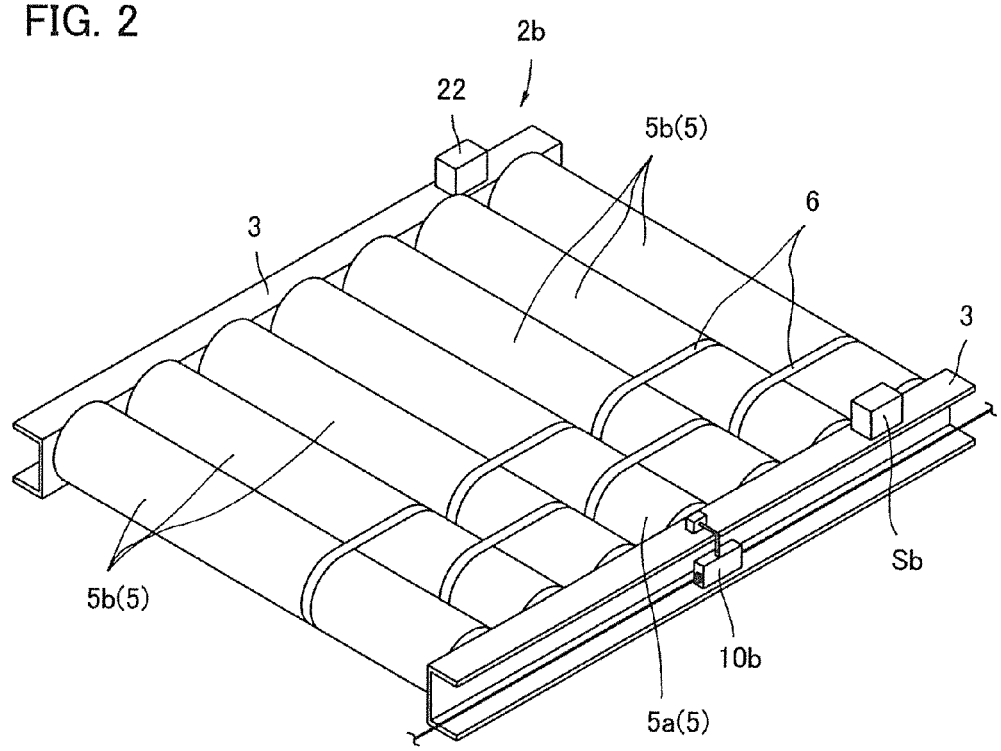
FIG. 2 is a perspective view illustrating a zone conveyor of the conveyor of FIG. 1.

As illustrated in FIG. 2, the zone conveyor 2b includes a pair of right and left side frames 3 which are arranged in parallel to each other and the plurality of conveying rollers 5 which convey a conveyance object and are rotatably supported between the frames 3 at predetermined intervals in the conveyance direction.

Each of the side frames 3 is a steel material having a U-shaped cross section. Specifically, channel steel or light weight C-shaped steel is used.

A plurality of hexagonal holes 16 are formed on each of the side frames 3.

Figure 3:
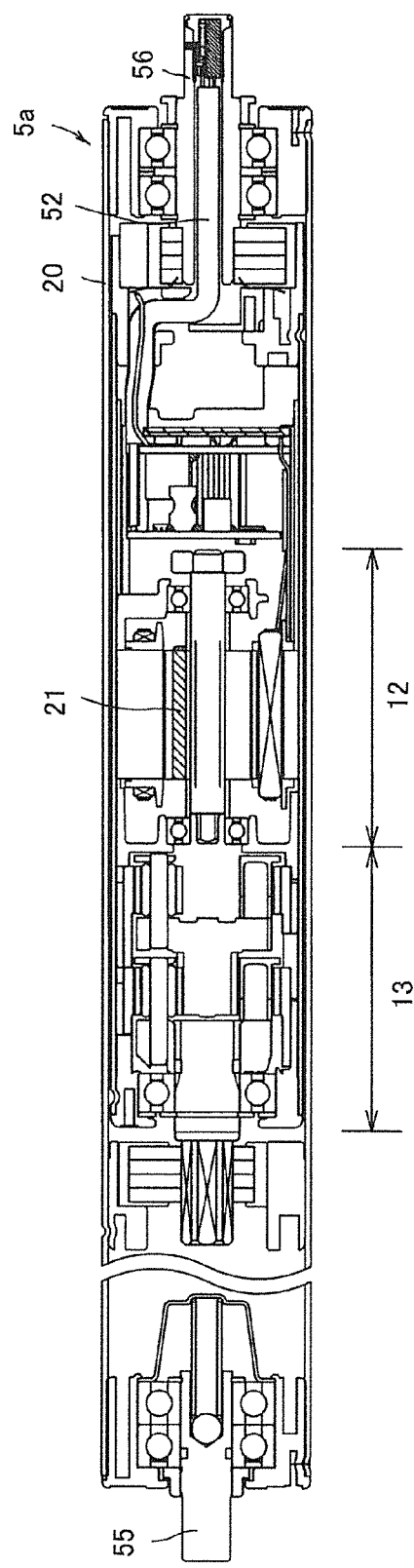
FIG. 3 is a sectional view illustrating a motor-incorporating roller employed in the conveyor of FIG. 1.

The conveying rollers 5 include freely rotatable follower rollers 5b and a motor-incorporating roller 5a which incorporates therein a drive motor 12 (not illustrated in FIG. 2, refer to FIG. 3). In the present embodiment, only one conveying roller 5 is the motor-incorporating roller 5a and the other six conveying rollers 5 are the follower rollers 5b.

The motor-incorporating roller 5a, for example, has an internal structure as illustrated in FIG. 3. Specifically, the motor-incorporating roller 5a includes a roller body 20, the drive motor 12, and a reduction gear 13, the drive motor 12 and the reduction gear 13 being incorporated in the roller body 20. The rotation of the drive motor 12 causes the roller body 20 to rotate.

In the motor-incorporating roller 5a employed in the present embodiment, a brushless motor is employed as the drive motor 12 incorporated therein.

Figure 5:
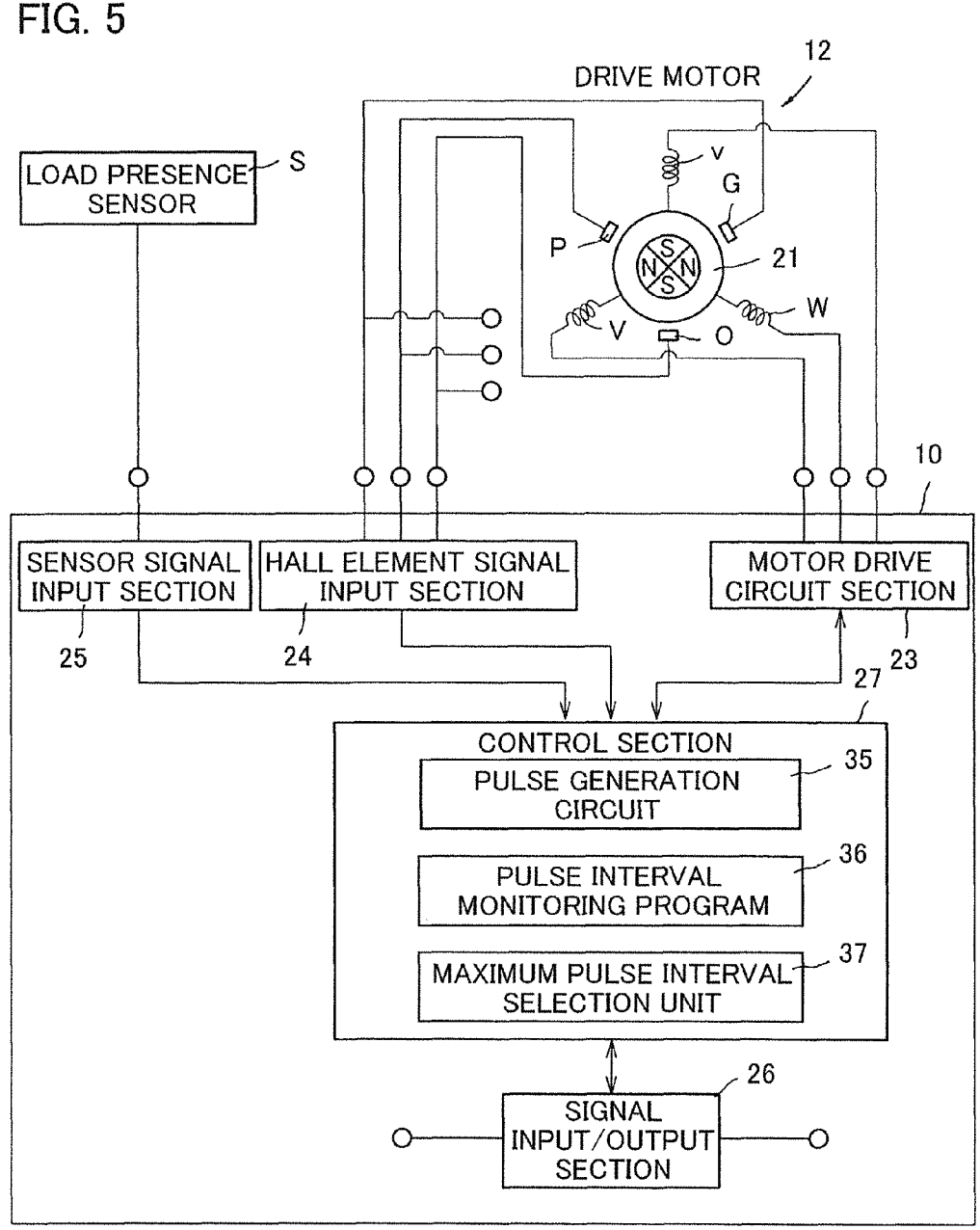
FIG. 5 is a conceptual diagram illustrating the relationship between the zone controller, a drive motor, and a load presence sensor employed in the conveyor of FIG. 1.

Specifically, the drive motor 12 employed in the present embodiment is a brushless motor as illustrated in FIG. 5 and includes a rotor 21 which has a permanent magnet and three-line stator coils (U, V, and W) which surround the rotor 21. Further, the drive motor 12 includes three Hall elements P, G, and O as a rotation position detection unit which detects the position of the rotor 21.

The motor-incorporating roller 5a includes fixed shafts 54 and 56 which protrude from both ends of the roller body 20. One of the fixed shafts, specifically, the fixed shaft 56 is hollow, and an electric wire group 52 which includes an electric supply line and a signal line is inserted into the fixed shaft 56.

The fixed shaft 56 has a hexagonal cross section. That is, one of the fixed shafts, specifically, the fixed shaft 56 is required to be unrotatably fixed to the corresponding side frame 3 in order to resist the reaction force of the drive motor 12 inside thereof and thus has a cross-sectional shape other than a circular shape.

Figure 6:
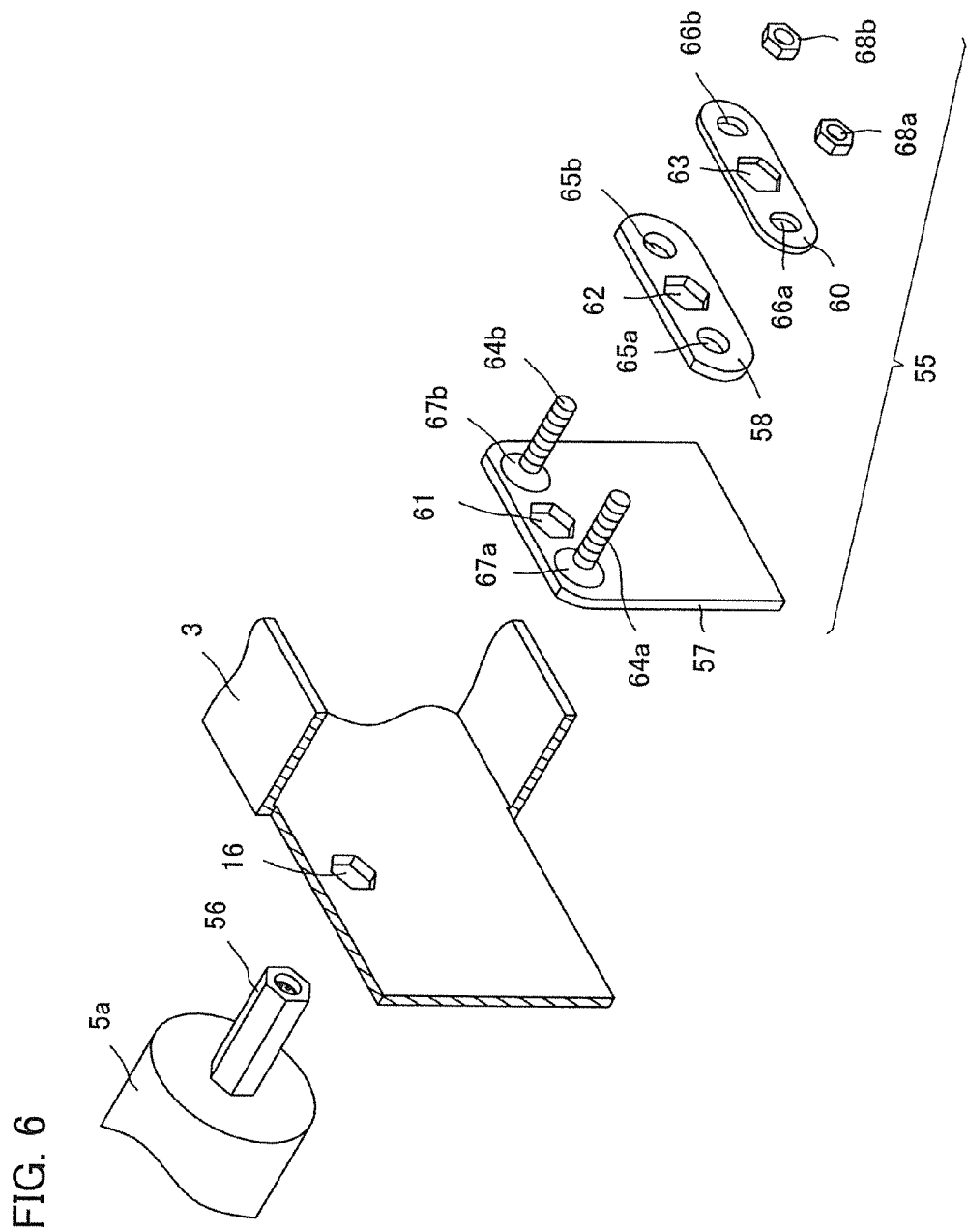
FIG. 6 is a sectional perspective view illustrating an attachment structure of the motor-incorporating roller to a frame in the conveyor of FIG. 1.
Figure 7:
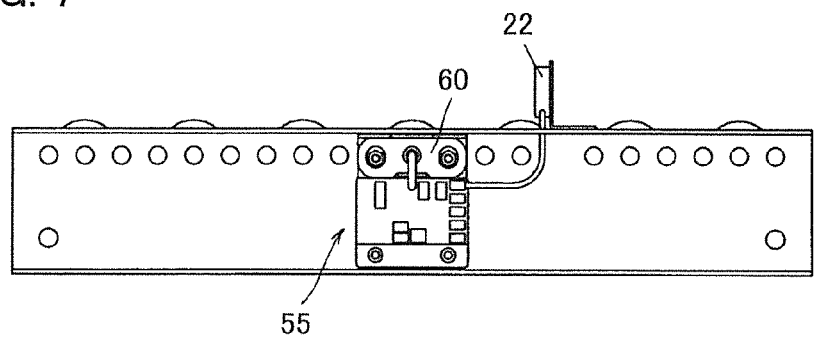
FIG. 7 is a side view of a region to which the motor-incorporating roller is attached in the conveyor of FIG. 1 viewed from the frame.

In the present embodiment, the motor-incorporating roller 5a is fixed to the side frame 3 with a metal fitting 55 as illustrated in FIGS. 6 and 7.

As illustrated in FIG. 6, the metal fitting 55 includes a body plate 57, an intermediate plate 58, and an outer plate 60.

Hexagonal holes 61, 62, and 63 are respectively formed on the body plate 57, the intermediate plate 58, and the outer plate 60.

Further, two male screws 64a and 64b are disposed in a standing manner on the body plate 57. The male screws 64a and 64b respectively have swells 67a and 67b on their bases. Holes 65a and 65b are formed on the intermediate plate 58. Holes 66a and 66b are formed on the outer plate 60. The male screw 64a is inserted into the holes 65a and 66a, and the male screw 64b is inserted into the holes 65b and 66b.

The body plate 57 is attached to the outer side of the side frame 3 with a screw (not illustrated).

The hexagonal fixed shaft 56 of the motor-incorporating roller 5a is inserted into the hexagonal hole 16 formed on the side frame 3 and the hexagonal holes 61, 62, and 63 formed on the respective members of the metal fitting 55. Nuts 68a and 68b are respectively engaged with the two male screws 64a and 64b which are disposed in a standing manner on the body plate 57 so that the intermediate plate 58 and the outer plate 60 are pressed against the body plate 57.

The swells 67a and 67b and the holes 65a, 65b, 66a, and 66b are designed so that the hexagonal holes 61, 62, and 63 respectively formed on the body plate 57, the intermediate plate 58, and the outer plate 60 are stabilized at positions slightly displaced from each other when the intermediate plate 58 and the outer plate 60 are pressed against the body plate 57. Thus, the fixed shaft 56 of the motor-incorporating roller 5a is fastened by the hexagonal holes 61, 62, and 63 formed on the respective members of the metal fitting 55 by inserting the hexagonal fixed shaft 56 of the incorporated roller 5a into the hexagonal holes 61, 62, and 63 formed on the respective members of the metal fitting 55, and engaging and fastening the nuts 68a and 68b respectively with the two male screws 64a and 64b. As a result, the motor-incorporating roller 5a is unrotatably attached to the side frame 3.

A transmission belt 6 is wound around each two of the conveying rollers 5 that are adjacent to each other in the zone conveyor 2b. Thus, the rotation driving force of the motor-incorporating roller 5a can be transmitted to all of the follower rollers 5b. In the present embodiment, the motor-incorporating roller 5a is arranged on the center.

As illustrated in FIG. 2, the load presence sensor Sb is provided in the zone conveyor 2b. The load present sensor Sb is disposed on one of the side frames 3. The load presence sensor Sb is located near an end on the downstream side in the conveyance direction.

The load presence sensor Sb is a photoelectric sensor. A light emitting element 22 such as a light emitting diode and an infrared diode is disposed on the opposed side frame 3. Accordingly, when a conveyance object is conveyed, light from the light emitting element 22 is blocked and the load presence sensor Sb outputs an on (H level) signal. On the other hand, when there is no conveyance object, the load presence sensor Sb outputs an off (L level) signal. In this manner, the photoelectric sensor is turned on/off so that conveyance of a conveyance object to a predetermined position can be detected.

Figure 4:
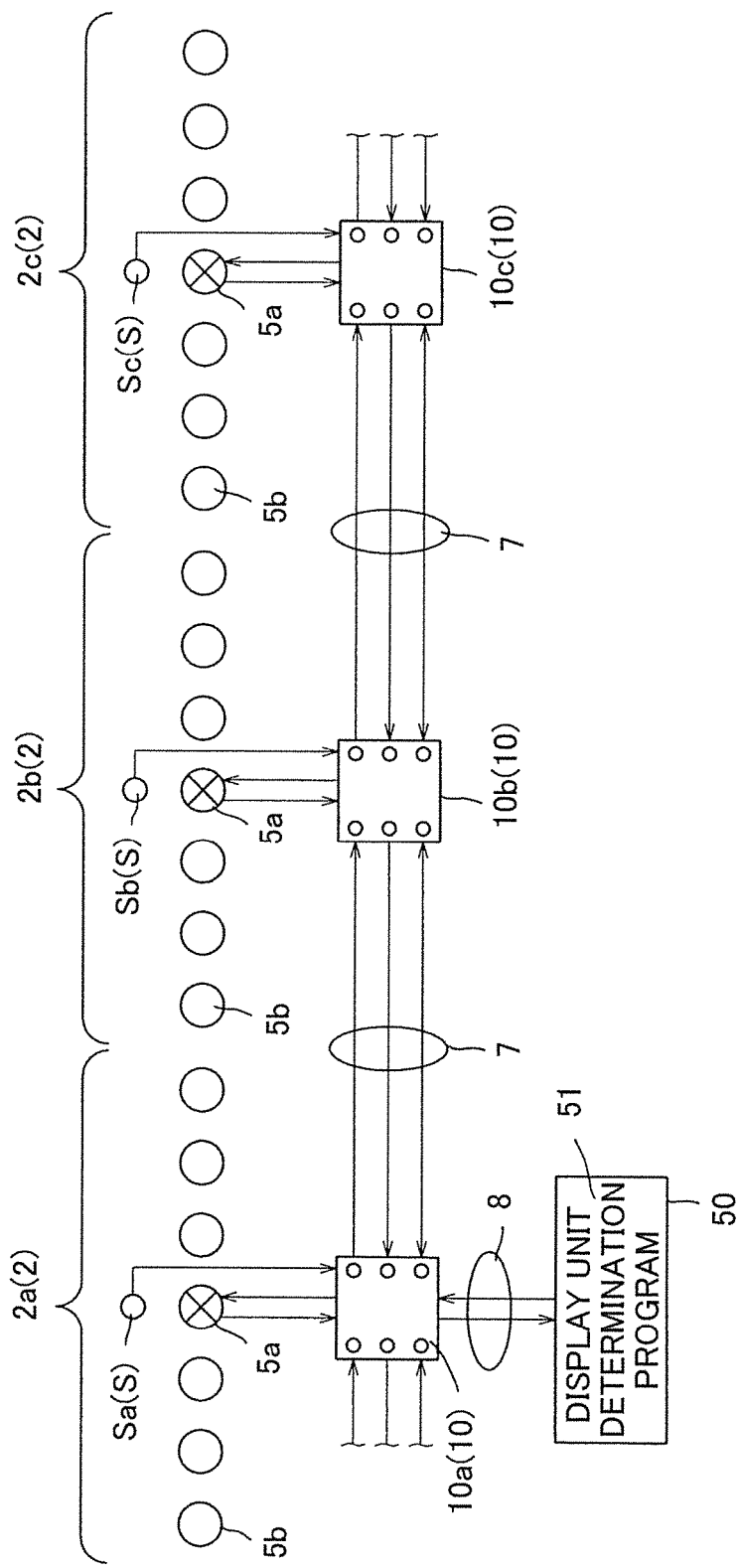
FIG. 4 is an explanatory diagram illustrating wiring of the conveyor of FIG. 1.

As illustrated in FIG. 4, the zone controller 10b for performing drive control for the drive motor 12 (refer to FIG. 3) which is incorporated in the motor-incorporating roller 5a is attached to one of the side frames 3 of the zone conveyor 2b.

As illustrated in FIG. 5, the zone controller 10b includes a motor drive circuit section 23, a Hall element signal input section 24, a sensor signal input section 25, a signal input/output section 26, and a control section 27.

The motor drive circuit section 23 is a switching circuit for sequentially energizing the stator coils (U, V, and W) of the drive motor 12.

The Hall element signal input section 24 is a circuit into which signals from the Hall elements P, G, and O of the drive motor 12 are input.

The control section 27 includes a CPU and a memory (not illustrated) and performs PWM control, rotation speed calculation, and conveyance mode control.

The signal input/output section 26 is a circuit for performing communication with the zone controllers 10a and 10c adjacent thereto. In the present embodiment, the signal input/output section 26 also functions as a transmission unit for transmitting information about the maximum interval to the outside.

The zone controller 10b performs drive control for the drive motor 12 (refer to FIG. 3) as described above. Specifically, the zone controller 10b has a function of smoothly rotating the drive motor 12, a function of maintaining the rotation speed of the drive motor 12 at a constant speed, and a function of starting and stopping the drive motor 12.

As described above, the drive motor 12 is a brushless motor and includes the rotor 21 which has the permanent magnet, the three-line stator coils (U, V, and W) which surround the rotor 21, and the Hall elements P, G, and O as the rotation position detection unit.

The zone controller 10b sequentially energizes the stator coils (U, V, and W) in accordance with the position (rotation position) of the rotor 21 to generate a rotating magnetic field to thereby smoothly rotate the rotor 21. Specifically, a signal is transmitted from the Hall elements P, G, or O in accordance with the rotation position of the rotor 21, and the stator coil (U, V, or W) to which current is supplied is switched based on the signal to generate a rotating magnetic field on the stator coil (U, V, or W) to rotate the rotor 21. In this manner, the zone controller 10b has a function of smoothly rotating the drive motor 12.

The zone controller 10b has programs corresponding to various conveyance modes which are stored in the control section 27 and starts or sops the drive motor 12 in accordance with a conveyance mode.

For example, when conditions such that there is a conveyance object in a zone on the upstream side and there is no conveyance object on its own zone are satisfied, the zone controller 10b starts the drive motor 12 of its own. Further, for example, the zone controller 10b stops the drive motor 12 of its own on the condition that the conveyance object has been conveyed out of its own zone.

Although there are various conveyance modes, detail description thereof will be omitted.

In the roller conveyor 1 of the present embodiment, the zone controllers 10 (10a, . . . 10c, . . . 10n) which are provided in the zone conveyors 2 (2a, 2b, 2c, 2d . . . ) adjacent to each other are connected to each other through a signal line 7 as illustrated in FIGS. 1 and 4. Further, at least one (the zone conveyor 2a in the present embodiment) of the zone controllers 10 (10a . . . 10n) and a host controller 50 are connected to each other through a signal line 8.

As indicated by arrows in FIG. 4, in the zone controller 10 (zone controller 10b) of the present embodiment, a load presence signal of the zone controller 10 (zone controller 10a) that is adjacent thereto on the upstream side in a flow direction of a conveyance object, a load presence signal of the zone controller 10 (zone controller 10c) that is adjacent thereto on the downstream side, and a driving state signal of the zone on the downstream side are input to the zone controller 10b through the signal input/output section 26.

A load presence signal and a driving state signal output from the zone controller 10b are transferred to the zone controllers 10a and 10c through the signal input/output section 26.

The load presence signal is a detection signal of the load presence sensors Sa to Sc (refer to FIGS. 1 and 4) provided in the respective control zones.

In the roller conveyor 1 of the present embodiment, each of the zone controllers 10 can refer to load presence signals on the upstream side and the downstream side and a driving state signal on the downstream side.

An instruction signal from the host controller 50 is transferred to a predetermined zone controller 10 (zone controller 10a) through the signal line 8 and further transferred to all of the zone controllers 10 constituting the roller conveyor 1 from the predetermined zone controller 10 (zone controller 10a) (refer to FIG. 4).

An on/off state of the load presence sensors S of the adjacent zones and information whether the drive motors 12 of the adjacent zones have been activated are exchanged between the zone controllers 10.

For example, when predetermined conditions such that there is a conveyance object on its own zone and there is no conveyance object on the downstream side zone are satisfied, the zone controller 10 activates the drive motor 12 of its own zone and sends the conveyance object to the downstream side zone.

The roller conveyor 1 of the present embodiment has a failure detection function as a characteristic function and is capable of operating in a failure diagnosis mode. The failure detection function is executed by an instruction of the host controller 50.

The failure detection function is achieved by the Hall element signal input section 24 and the control section 27 in each of the zone controllers 10 and a determination program 51 of the host controller 50.

In the present embodiment, in addition to a program that controls the conveyance operation described above, a pulse interval monitoring program 36 which monitors pulse signal intervals and a maximum pulse interval selection program 37 are stored in the memory (not illustrated) in the control section 27 of each of the zone controllers 10.

The determination program 51 determines whether there is a failure by comparing the maximum pulse interval with a preset/predetermined threshold interval that is stored in the host controller 50.

Hereinbelow, the failure detection function will be described.

A pulse signal is generated based on a signal of the Hall element P, G, or O input from the Hall element signal input section 24.

In the present embodiment, a pulse signal switching interval is defined to as "a pulse signal interval". The switching interval is obtained by equally detecting reciprocation switching intervals. Thus, "the pulse signal interval" described below is approximately half "a pulse signal generation interval" and the number of detected pulse signal intervals is approximately twice "the number of detected pulse signal generation intervals".

That is, "the pulse signal generation interval" is an interval of detection signals generated by the poles of the rotor 21.

In the drive motor 12 employed in the present embodiment, the rotor 21 is a permanent magnet provided with two N poles and two S poles. Thus, when the rotor 21 makes one rotation, the two N poles and the two S poles pass the vicinity of each of the Hall elements P, G, and O. Thus, when the rotor 21 makes one rotation, electromotive force is generated four times from each of the Hall elements P, G, and O. That is, the electromotive force is generated 12 times in total.

In the zone controller 10 of the present embodiment, the electromotive force is input to the Hall element signal input section 24 and converted into a pulse signal in a pulse generation circuit 35. As described above, when the rotor 21 makes one rotation, the electromotive force is generated 12 times. Thus, when the rotor 21 makes one rotation, 12 pulse signals are generated.

The pulse interval monitoring program 36 monitors switching intervals of pulse signals that are generated based on signals of the Hall elements P, G, and O input from the Hall element signal input section 24.

The pulse interval monitoring program 36 detects the switching interval of pulse signals based on position detection signals of the Hall elements P, G, and O and operates only on a certain generation number.

That is, upon receiving an instruction for executing failure determination from the host controller 50, the pulse interval monitoring program 36 stops the motor-incorporating roller 5a and detects the switching intervals of position detection signals of the Hall elements P, G, and O in the stopping process. Specifically, a signal for stopping the motor-incorporating roller 5a is transmitted or received, and the switching interval of pulse signal is then measured up to the ninth pulse interval.

That is, in the present embodiment, after energization to the motor-incorporating roller is stopped, the pulse signal interval is monitored until the number of generated pulse signal intervals becomes a certain number.

Figure 8:
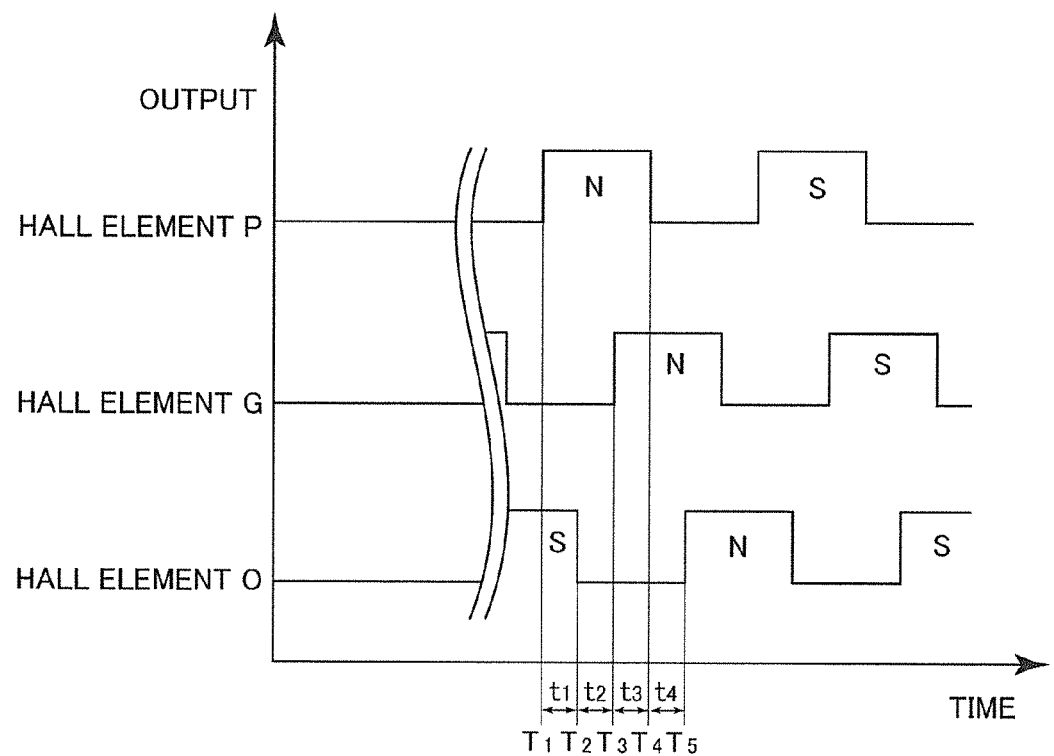
FIG. 8 is an explanatory diagram illustrating the operation of a pulse interval monitoring program.

As illustrated in FIG. 8, the pulse interval monitoring program 36 detects switching intervals t of pulse signals originating from signals of the Hall elements P, G, and O. That is, the switching intervals are simply detected without distinguishing between signals emitted from the three Hall elements P, G, and O. Further, without distinguishing between the rise and fall of each pulse signal, an interval from a rise to a fall and an interval from a fall to a rise are each defined as one "pulse signal interval". Thus, as described above, a time of "the pulse signal interval" is approximately half "the pulse signal generation interval", and the number of detected pulse signal intervals is approximately twice "the number of detected pulse signal generation intervals".

Referring to FIG. 8, a time t1 between a rise time T1 of the Hall element P and a fall time T2 of the Hall element O is measured (the first pulse interval). Then, a time t2 between a fall time T2 of the Hall element O and a rise time T3 of the Hall element G is measured (the second pulse interval). Further, a time t3 between a rise time T3 of the Hall element G and a fall time T4 of the Hall element P is measured (the third pulse interval). In this manner, switching intervals of pulse signals are sequentially measured.

The maximum pulse interval selection program 37 selects the maximum one from pulse signal switching intervals detected by the pulse interval monitoring program 36.

The determination program 51 stored in the host controller 50 determines whether there is a failure by comparing the maximum switching interval transmitted from the zone controller 10 with the preset threshold.

The determination program 51 determines whether there is a remarkably long pulse signal interval when the rotation of the motor-incorporating roller 5a is stopped.

When the currently driven motor-incorporating roller 5a is stopped, the interval of pulse signals generated by the motor-incorporating roller 5a is gradually extended and should finally become infinite.

However, when there is looseness in the metal fitting 55 of the motor-incorporating roller 5a, a delay phenomenon in which the interval of motor pulses generated by the motor-incorporating roller 5a is temporarily extended occurs. Then, a characteristic phenomenon in which the pulse signal interval is shortened and the motor-incorporating roller 5a then comes to a stop occurs after the delay phenomenon.

In the determination program 51 of the present embodiment, whether the delay phenomenon has occurred is determined. When the delay phenomenon has occurred, display notifying that there is looseness in the metal fitting 55 is performed on a display screen (display unit).

Hereinbelow, the delay phenomenon and the characteristic phenomenon will be described.

Figure 9:
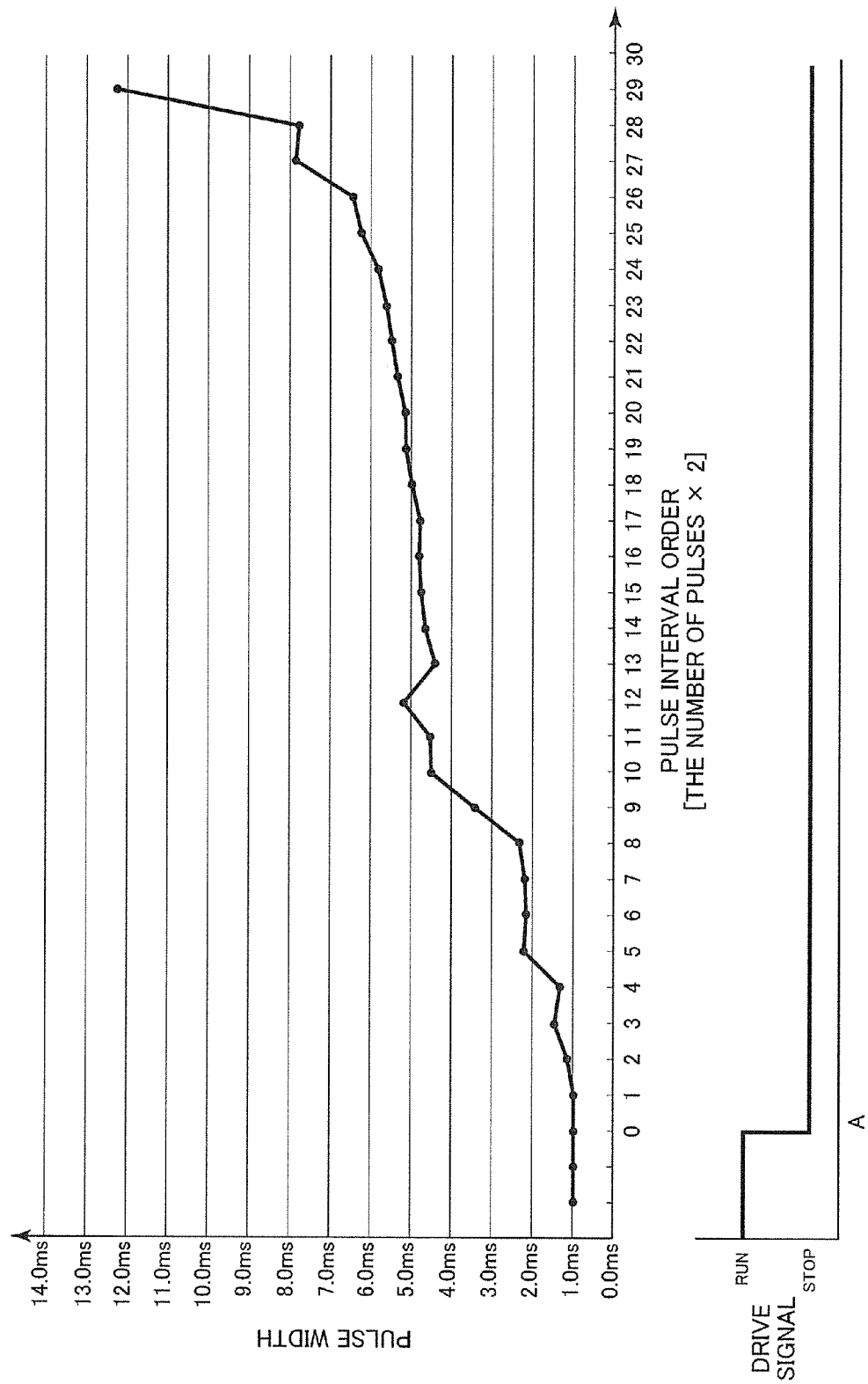
FIG. 9 is a graph illustrating a pulse generation state when the drive of the conveyor of FIG. 1 with no looseness in a metal fitting is stopped in which the horizontal axis represents the order of a generated pulse interval (pulse reciprocation switching interval) and the vertical axis represents a pulse interval as time.

FIG. 9 is a graph illustrating pulse signal intervals when there is no looseness in the metal fitting 55. FIG. 9 illustrates pulse signal intervals actually measured using the roller conveyor 1 illustrated in FIG. 1 in which the six follower rollers 5b are connected to the motor-incorporating roller 5a through the transmission belts 6.

As illustrated in FIG. 9, a drive signal is RUN until a time A, and the motor-incorporating roller 5a rotates at a constant rotation speed. Thus, the pulse signal interval is constant until the time A.

Then, the drive signal is switched from RUN to STOP at the time A, so that power supply to the motor-incorporating roller 5a is stopped. As a result, the speed of the motor-incorporating roller 5a is gradually reduced to extend the pulse signal interval as a natural result. When there is no looseness in the metal fitting 55, the pulse signal interval becomes longer as time passes. Then, after a certain number of rises and falls of pulse signals occurs, the pulse signal interval becomes a slightly steady state. Then, the pulse signal interval is extended in a range of two to four pulse intervals immediately before the rotation of a roller of the motor-incorporating roller 5 actually stops. Then, the generation of a pulse is finally stopped.

On the other hand, when there is looseness in the metal fitting 55, the pulse signal interval varies. Specifically, the pulse signal interval is temporarily extended (delay phenomenon) and then again shortened (characteristic phenomenon).

Figure 10:
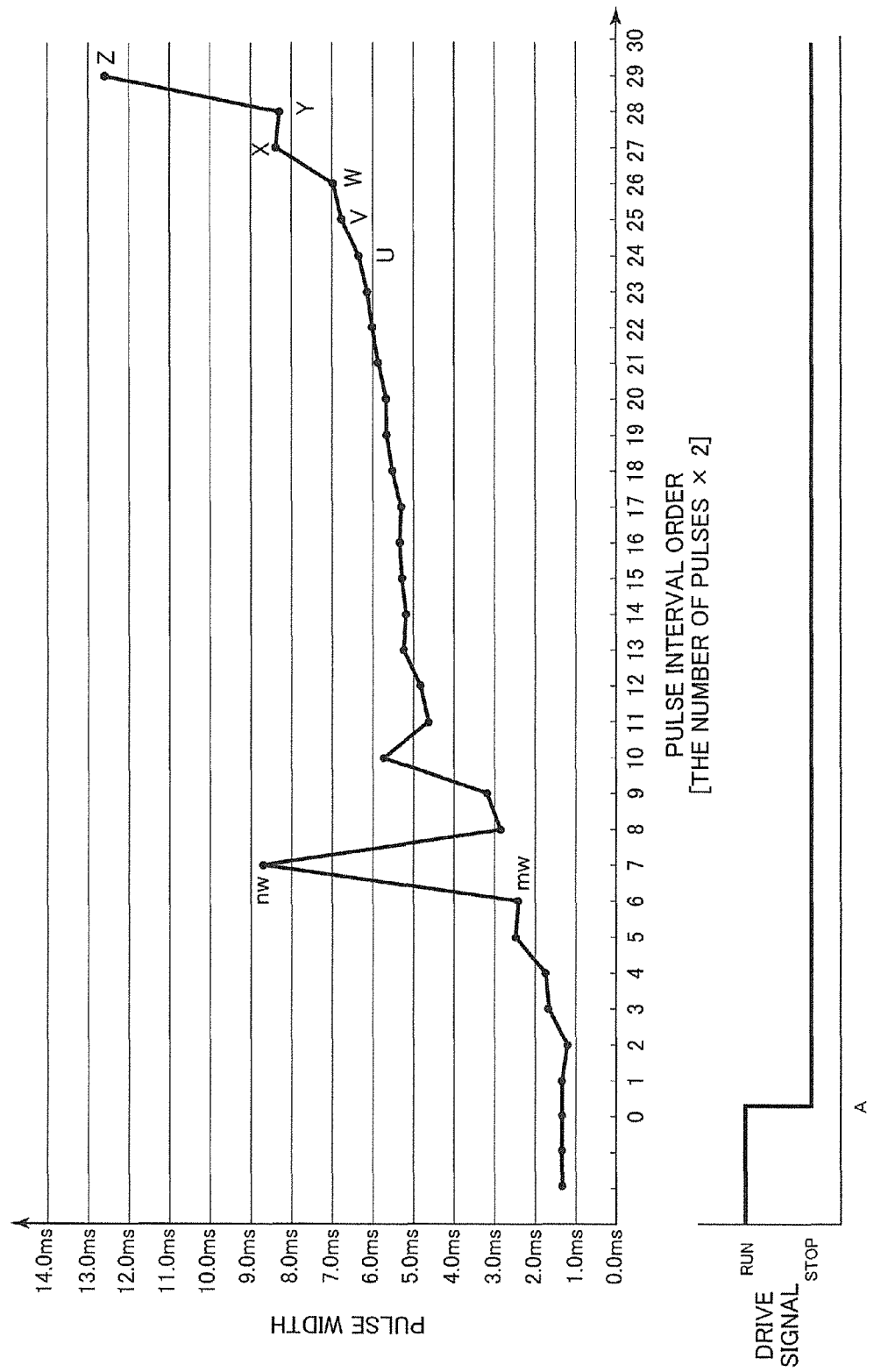
FIG. 10 is a graph illustrating a pulse generation state when the drive of the conveyor of FIG. 1 with looseness in the metal fitting is stopped in which the horizontal axis represents the order of a generated pulse interval (pulse reciprocation switching interval) and the vertical axis represents a pulse interval as time.

FIG. 10 is a graph illustrating pulse signal intervals when there is looseness in the metal fitting 55. FIG. 10 also illustrates pulse signal intervals actually measured using the roller conveyor 1 illustrated in FIG. 1 in which the six follower rollers 5b are connected to the motor-incorporating roller 5a through the transmission belts 6.

As illustrated in FIG. 10, the drive signal is RUN until the time A, and the motor-incorporating roller 5a rotates at a constant rotation speed. Thus, the pulse signal interval is constant until the time A.

Then, the drive signal is switched from RUN to STOP at the time A, so that power supply to the motor-incorporating roller 5a is stopped. As a result, the speed of the motor-incorporating roller 5a is gradually reduced to extend the pulse signal interval as a natural result. Even when there is looseness in the metal fitting 55, the pulse signal interval has a tendency to extend as time passes. However, after the drive signal is switched from RUN to STOP, the seventh pulse interval nw becomes extremely longer than the sixth pulse interval mw (delay phenomenon), and the following eighth pulse interval lw becomes shorter than the peak pulse interval (nw) (characteristic phenomenon).

The maximum pulse interval selection program 37 employed in the present embodiment monitors whether such a delay phenomenon in which the pulse interval is temporarily extended occurs to detect the looseness of the metal fitting 55.

FIGS. 9 and 10 illustrate phenomena that occur in a roller conveyor such as the roller conveyor 1 illustrated in FIG. 1 having a structure that rotates the plurality of follower rollers 5b by the single motor-incorporating roller 5a. However, the same phenomena occur also in a roller conveyor having a structure that drives no follower roller 5b.

For reference, behavior when no follower roller 5b is provided will be described as an additional remark.

Figure 11:
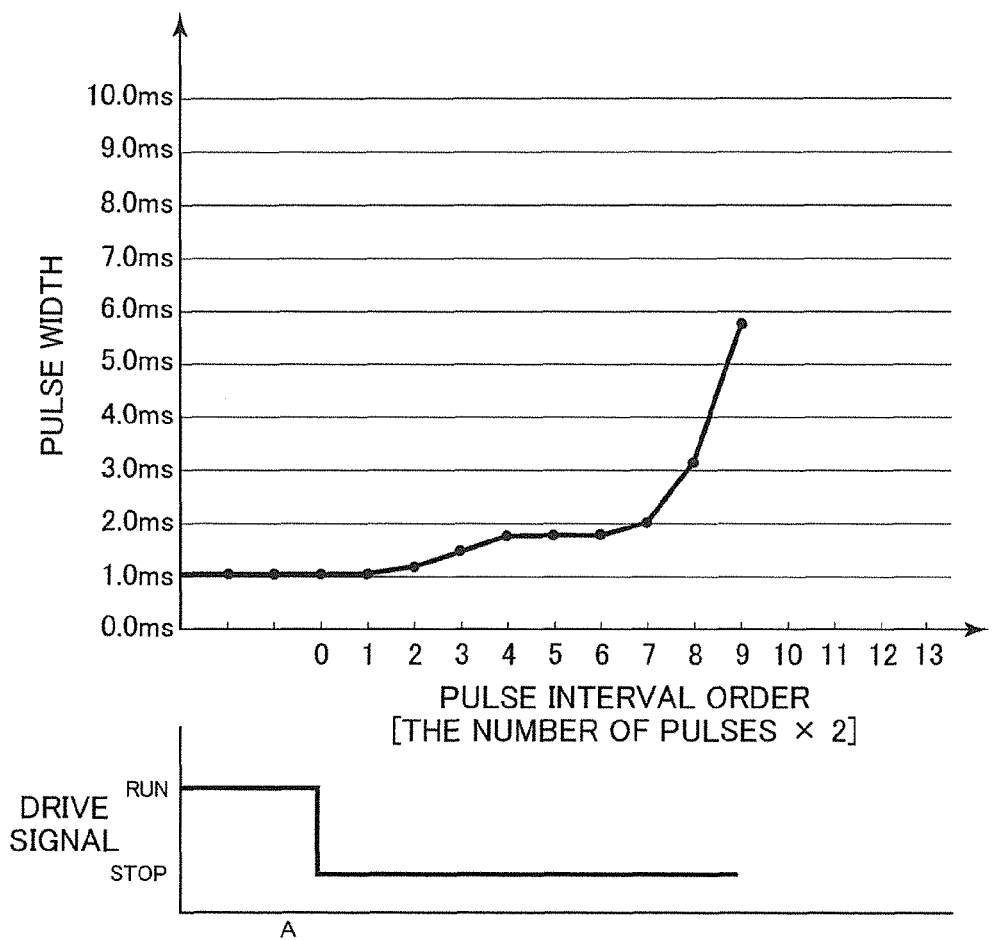
FIG. 11 is a graph illustrating a pulse generation state when the motor-incorporating roller alone is driven and stopped with no looseness in the metal fitting in which the horizontal axis represents the order of a generated pulse interval (pulse reciprocation switching interval) and the vertical axis represents a pulse interval as time.

FIG. 11 is a graph obtained by fixing a single motor-incorporating roller 5a to a frame (not illustrated) and measuring the pulse interval when the motor-incorporating roller 5a is stopped.

As illustrated in FIG. 11, when the drive signal is switched from RUN to STOP, the speed of the motor-incorporating roller 5a is gradually reduced to extend the pulse signal interval as a natural result. When there is no looseness in the metal fitting 55, the pulse signal interval becomes longer as time passes.

Then, the generation of a pulse is finally stopped.

On the other hand, when there is looseness in the metal fitting 55, the pulse signal interval varies in the same manner as in the above experiment. Specifically, the pulse signal interval is temporarily extended and then again shortened.

Figure 12:
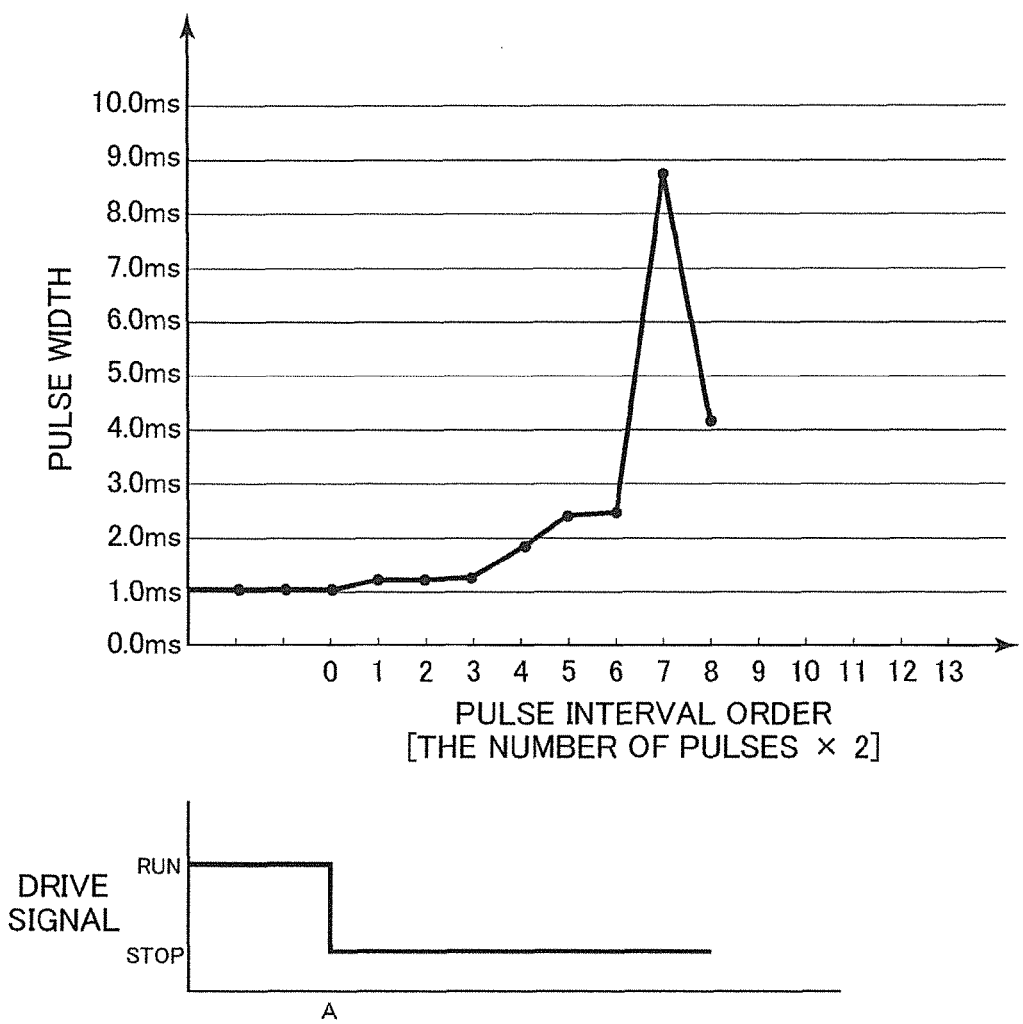
FIG. 12 is a graph illustrating a pulse generation state when the motor-incorporating roller alone is driven and stopped with looseness in the metal fitting in which the horizontal axis represents the order of a generated pulse interval (pulse reciprocation switching interval) and the vertical axis represents a pulse interval as time.

As illustrated in FIG. 12, the drive signal is RUN until the time A, and the motor-incorporating roller 5a rotates at a constant rotation speed. Thus, the pulse signal interval is constant until the time A.

Then, the drive signal is switched from RUN to STOP at the time A, so that power supply to the motor-incorporating roller 5a is stopped. As a result, the speed of the motor-incorporating roller 5a is gradually reduced to extend the pulse signal interval as a natural result. Even when there is looseness in the metal fitting 55, the pulse signal interval has a tendency to extend as time passes. However, after the drive signal is switched from RUN to STOP, the seventh pulse interval nw becomes extremely longer than the immediately preceding pulse interval mw, and the eighth pulse interval L becomes short.

The pulse interval monitoring program 36 of the present embodiment is employed in a roller conveyor such as the roller conveyor 1 illustrated in FIG. 1 having a structure that rotates the plurality of follower rollers 5b by the single motor-incorporating roller 5a. Thus, pulse signal intervals are as illustrated in FIGS. 9 and 10.

The pulse interval monitoring program 36 of the present embodiment monitors pulse signal intervals excepting a period immediately before the motor-incorporating roller 5a stops in which the pulse signal interval is extended. Specifically, a pulse signal immediately before the rotation of the roller of the motor-incorporating roller 5a actually stops becomes longest, and this longest pulse interval is ignored. Further, pulse intervals around this longest pulse interval are also excluded, and only pulse intervals generated therebefore are monitored.

Specifically, the pulse interval monitoring program 36 ignores several pulse intervals including a pulse interval Z detected at last, specifically, approximately two pulse intervals immediately before the stop (Z and Y in FIG. 10) to four pulse intervals immediately before the stop (Z, Y, X, and W in FIG. 10) and monitors pulse signal intervals generated therebefore (from the first pulse interval to the pulse interval X or V in FIG. 10). In the present embodiment, the pulse signal switching interval is monitored until the number of generated pulse intervals reaches the number smaller than the number of the finally detected pulse interval Z (generation number) by three or more.

According to the experiment performed by the present inventors, approximately 30 (29 in FIG. 10) pulse signal intervals are detected until the motor-incorporating roller 5a stops. As described above, the delay phenomenon occurs at the seventh pulse interval after the drive signal is switched from RUN to STOP. Thus, performing monitoring until the ninth pulse interval has no practical problem.

Specifically, pulse signals of approximately 15 pulses are generated after the power supply to the motor-incorporating roller 5a is stopped, and the motor-incorporating roller 5a stops after approximately 30 (29, exactly) pulse signal intervals are detected. However, monitoring until the ninth pulse interval eliminates the necessity of monitoring approximately 21 (20, exactly) pulse intervals thereafter.

This will be described with the relationship with the rotation angle of the motor. The motor-incorporating roller 5a employed in the present embodiment generates 12 pulses per one rotation of the motor, and approximately 24 pulse signal intervals are detected. Thus, it is sufficient to monitor pulse intervals while the motor makes an approximately ⅜ rotation. Specifically, it is sufficient to check pulse intervals that are generated approximately from 0° to 140°.

As described above, in the present embodiment, the motor-incorporating roller 5a stops after pulse signals of approximately 15 pulses are generated and approximately 30 pulse signal intervals are detected. However, monitoring until the ninth pulse interval eliminates the necessity of monitoring approximately 21 pulse intervals thereafter.

That is, in N pulses generated until the motor-incorporating roller 5a stops after the power supply thereto is stopped, it is recommended to monitor pulse signal intervals up to N minus 3/2 pulses. More desirably, it is desired to monitor pulse signal intervals up to N/2 pulses, and more desired to monitor pulse signal intervals up to 5 pulses after the power supply is stopped. The most recommended measurement interval is to monitor pulse signal intervals while the motor makes a ⅜ rotation.

Monitoring up to "N minus 3/2 pulses" results in monitoring the pulse signal switching interval until the number of generated pulse intervals reaches a number that is less by three or more than the number of pulse intervals (generation number) generated until the finally detected pulse interval Z.

A time for starting the monitoring may be immediately after the energization to the motor-incorporating roller 5a is stopped, or the first pulse signal may be ignored. Further, the monitoring may be started from the third pulse interval or the fourth pulse interval.

Determination of whether the delay phenomenon has occurred is performed by defining a certain threshold TS and determining whether there has been a change exceeding the threshold.

The threshold TS is, for example, 5 ms. The threshold changes depending on the number of poles of the rotor 21 or the number of detection units such as Hall elements. Further, an appropriate value changes depending on the rotation speed when the motor-incorporating roller 5a is stopped.

The threshold TS is desirably determined by a pulse signal interval immediately before the motor-incorporating roller 5a is stopped (immediately before the power supply is stopped) when the motor-incorporating roller 5a is rotated on the condition that there is no backlash or the like in attachment of the motor-incorporating roller 5a. When a pulse signal interval immediately before the motor-incorporating roller 5a is stopped is defined as a reference interval ts, the threshold TS is desirably set at approximately three to ten times the reference interval ts. More desirably, the threshold TS is approximately four to eight times the reference interval ts.

In the present embodiment, the threshold TS is set at approximately five times the reference interval ts.

When a change in the pulse interval exceeds 20 times the reference interval ts, it is desired to determine as an inspection error.

Whether the delay phenomenon has occurred may be determined by comparing any pulse signal interval nw with the immediately preceding pulse signal interval mw and determining whether a difference between the pulse signal interval nw and the immediately preceding pulse signal interval mw is a predetermined ratio or more on the basis of the immediately preceding pulse signal interval mw or the specific pulse signal interval nw. For example, a difference between the pulse signal interval nw and the immediately preceding pulse signal interval mw that is 30% or more of the immediately preceding pulse signal interval mw, or 60% or more of the immediately preceding pulse signal interval mw may be set as a threshold. The threshold is desirably 30% or more of the immediately preceding pulse signal interval mw.

However, when the difference between the pulse signal interval nw and the immediately preceding pulse signal interval mw is extremely long, for example, ten times the immediately preceding pulse signal interval mw, this case is excluded and determined as an inspection error.

A range to be excluded as an inspection error is desirably five to ten times the immediately preceding pulse signal interval mw.

As describe above, the failure detection function is executed by an instruction of the host controller 50. That is, the host controller 50 transmits a signal for executing a failure detection operation to each of the zone controllers 10 at a time period such as before starting work and during a lunch break. Upon receiving the signal, each of the zone controllers 10 activates the corresponding motor-incorporating roller 5a. Specifically, each of the zone controllers 10 transmits a RUN signal to the motor-incorporating roller 5a.

When the speed of the motor-incorporating roller 5a can be changed, for example, the speed is controlled at a constant circumferential speed, for example, 60 m/min. After a certain time (for example, after two to five seconds), the motor-incorporating roller 5a is stopped. Specifically, each of the zone controllers 10 transmits a STOP signal to the motor-incorporating roller 5a.

Then, pulse intervals thereafter are detected by the pulse interval monitoring program 36, and the maximum pulse interval during the detection by the pulse interval monitoring program 36 is detected by the maximum pulse interval selection program 37. Then, the host controller 50 compares the detected maximum pulse interval with the threshold TS to determine whether the delay phenomenon has occurred.

Hereinbelow, the operation of each section in the failure diagnosis mode will be described with reference to FIG. 14.

Figure 14:
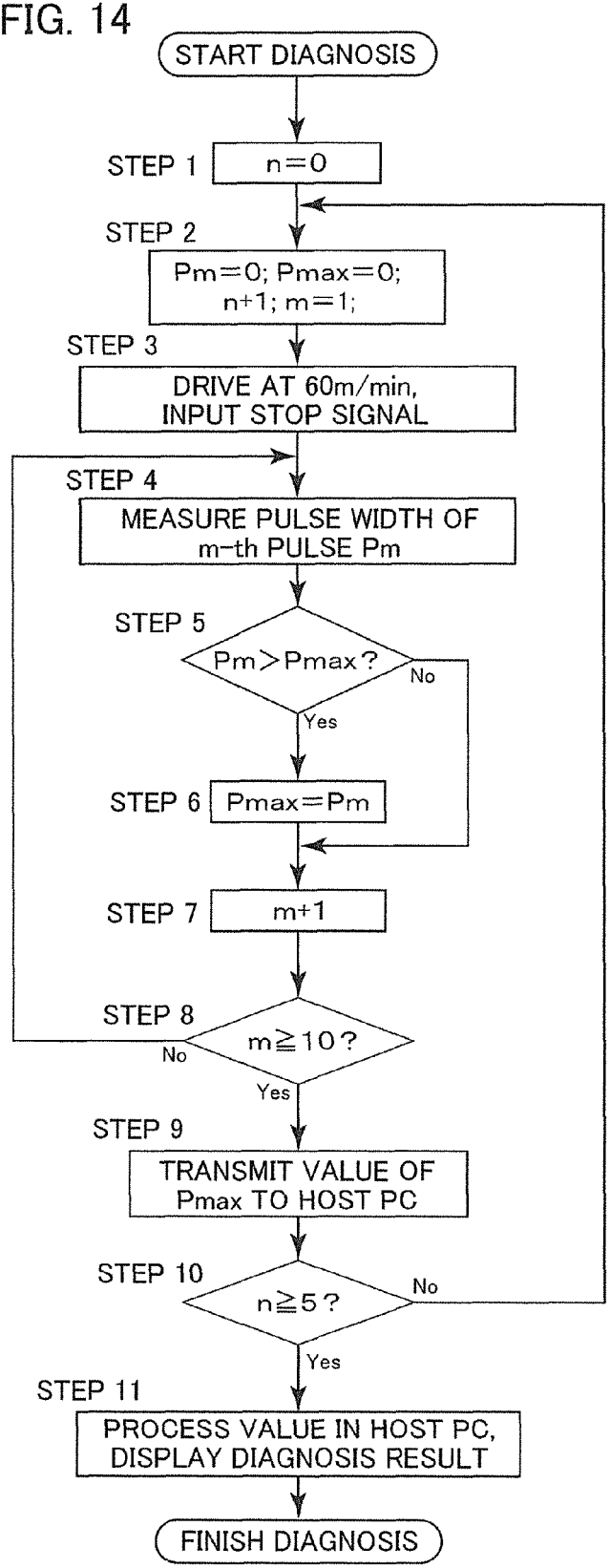
FIG. 14 is a flow chart illustrating the operation of a failure diagnosis mode in the conveyor of FIG. 1.

In the flow chart illustrated in FIG. 14, a series of operations for measuring each pulse signal interval from the first pulse interval to the ninth pulse interval after the motor-incorporating roller 5a is stopped is defined as one course, and a series of operations is performed for five courses.

The failure diagnosis mode is started by operating an input device (not illustrated) of the host controller 50. Specifically, a signal for executing the failure diagnosis mode is transmitted from the host controller 50 to each of the zone controllers 10.

Upon receiving the signal, each of the zone controllers 10 returns a repetition number counter n in the memory of its own to zero (step 1). The repetition number counter n is used for checking the course number of an operation.

Then, one is added to the repetition number counter n in step 3. Further, a value of a Pm memory and a value of a Pmax memory incorporated in the zone controller 10 are cleared to zero.

The Pm memory temporarily stores a pulse signal interval. The Pmax memory temporarily stores the maximum pulse signal interval so far.

Further, one is added to a pulse order checking counter m. The pulse order checking counter m is a memory for checking the order at which a pulse signal currently measured has been generated after the stop of the motor-incorporating roller 5a.

Further, the motor-incorporating roller 5a is activated in step 3. Specifically, each of the zone controllers 10 drives the motor drive circuit section 23 to sequentially energize the stator coils (U, V, and W) of the drive motor 12.

The rotation speed of the motor-incorporating roller 5a is fed back to control the circumferential speed of the motor-incorporating roller 5a to be 60 m/min.

When a certain time (three seconds, for example) has passed after the activation of the motor-incorporating roller 5a and the rotation speed of the motor-incorporating roller 5a is stabilized, the energization from the motor drive circuit section 23 to the stator coils (U, V, and W) is stopped (step 3).

Then, an interval of pulse signals generated immediately after the stop is measured in step 4. Specifically, the pulse interval monitoring program 36 stored in each of the zone controllers 10 measures an interval of pulse signals generated immediately after the energization to the stator coils is stopped in step 4. Strictly speaking, the first pulse interval generated after the stop cannot be regarded as "the pulse signal interval". That is, since the generation time and the disappearance time of a pulse signal immediately before the first pulse interval are unclear, the first pulse interval does not exactly indicate "the initial pulse signal interval".

The pulse signal interval measured in step 4 is temporarily stored in the Pm memory of the zone controller 10.

In the following step 5, the pulse signal interval temporarily stored in the Pm memory is compared with the maximum pulse signal stored in the Pmax memory so far.

The maximum pulse interval selection program 37 stored in each of the zone controllers 10 bears this function.

In this time, since the first pulse interval has no comparison target, the stored time of the Pm memory is, of course, longer than a stored time stored in the Pmax memory. Thus, a shift from step 5 to step 6 is made to rewrite data of the Pmax memory to the stored time of the Pm memory.

Then, a shift to step 7 is made to add one to the pulse order check counter m.

Then, a shift to step 8 is made to check the number of the pulse order check counter m. When the number is nine or less, a return to step 4 is made to measure the second pulse interval and rewrite the Pm memory of the zone controller 10.

In the following step 5, the pulse signal interval temporarily stored in the Pm memory is compared with the maximum pulse signal stored in the Pmax memory so far.

When the stored time of the Pm memory is longer than the stored time stored in the Pmax memory, a shift to step 6 is made to rewrite the data of the Pmax memory to the stored time of the Pm memory. Then, a shift to step 7 is made.

When the stored time of the Pm memory is shorter than the stored time stored in the Pmax memory, a shift to step 7 is made without going through step 6.

Then, a shift to step 7 is made to add one to the pulse order check counter m.

Then, a shift to step 8 is made to check the pulse order check counter m. When the pulse order is nine or less, a return to step 4 is made to measure the second pulse interval and rewrite the Pm memory of the zone controller 10.

The above operations are repeated. Then, when measurement of the ninth pulse interval is finished and a shift to step 8 is made, YES is determined in step 8 and a shift to step 9 is made. In step 9, the maximum pulse signal interval in the current course stored in the Pmax memory is transmitted to the host controller 50 and stored in the memory of the host controller 50.

Then, a shift to step 10 is made to check the number of the repetition number counter n. When the number of the repetition counter n is less than five, a return to step 2 is made to again repeat the above course.

Then, when measurement for five courses is finished, a shift to step 11 is made. In the present embodiment, step 11 is executed by the host controller 50. That is, step 11 is an operation achieved by the determination program 51 of the host controller 50.

In step 11, it is determined whether there is data of a pulse signal interval exceeding the threshold TS in the result of the measurement performed for five courses. When the pulse signal interval exceeding the threshold TS is confirmed, the fact that there is a motor-incorporating roller 5a in which the delay phenomenon has occurred is displayed on the display device of the host controller 50. Of course, the display is performed with a zone to which this motor-incorporating roller 5a belongs is specified.

In reality, display that specifically indicates a defective part such as "there is looseness in attachment of the motor-incorporating roller 5a" or "the metal fitting 55 is worn" is performed. Alternatively, a code that indicates a failure part is displayed on the display device of the host controller 50.

The host controller 50 may simply display whether the delay phenomenon has occurred, but desirably display the degree of the delay phenomenon together.

For example, a case in which the degree of extension of the pulse switching interval is small and it is not necessary to immediately take an action, a case in which the degree of extension of the pulse switching interval is a middle degree and it is desired to perform parts replacement in the next periodical inspection, and a case in which the degree of extension of the pulse switching interval is extremely large and it is necessary to immediately perform parts replacement are separately displayed.

More specifically, the degree of failure is desirably displayed in stages such as "normal", "attention", "warning", and "danger".

Although, in the embodiment described above, only the delay phenomenon is detected and whether the conveyor is in a normal state is determined by the degree of the delay phenomenon, the presence or absence of the characteristic phenomenon may be added to the determination criterion.

That is, a program for determining whether the characteristic phenomenon in which the pulse signal interval is temporarily extended and then shortened and the motor-incorporating roller 5a then comes to a stop has occurred by monitoring pulse signal intervals may be added.

Determination of whether the characteristic phenomenon has occurred is desirably performed by defining a certain threshold TK and determining whether there is a change exceeding the threshold TK.

For example, in the relationship between a current pulse signal interval, the immediately preceding pulse interval, and the immediately following pulse signal interval, a current pulse switching interval that is longer by 50% or more than the immediately preceding switching interval and the immediately following switching interval is desirably determined as the threshold TK. Further, a current pulse switching interval that is longer by 100% or more than the immediately preceding switching interval and the immediately following switching interval is further desirably determined as the threshold TK.

However, when the current pulse switching interval becomes an extremely long interval, for example, ten times the immediately preceding switching interval and the immediately following switching interval, this case is desirably excluded as an inspection error.

A range to be excluded as an inspection error is desirably approximately five to ten times the immediately preceding switching interval and the immediately following switching interval.

Whether the characteristic phenomenon has occurred may be determined based on a determination criterion such that, for example, the generation interval becomes shorter by a certain ratio, for example, 30% or more than the peak pulse signal interval.

According to the experiment performed by the present inventors, the pulse generation order at which the delay phenomenon or the characteristic phenomenon occurs is substantially constant. That is, according to the experiment performed by the present inventors, the characteristic phenomenon occurs at the seventh pulse interval or the eighth pulse interval after a stop signal is transmitted. Thus, even when only pulse intervals before and after the seventh or eighth pulse interval are monitored to determine the presence or absence of the delay phenomenon or the presence or absence of the characteristic phenomenon, failure detection can be performed with no practical problem.

In the present embodiment, it is sufficient to monitor a period between the sixth pulse interval and the ninth pulse interval. In the relationship with the rotation of the motor-incorporating roller, the motor-incorporating roller 5a employed in the present embodiment generates 12 pulses per one rotation of the motor, and 24 pulse signal switching intervals are detected. Thus, it is sufficient to monitor pulse intervals before and after the motor makes a ⅓ rotation. Specifically, it is sufficient to monitor pulse intervals that are generated while the motor rotates by approximately 90° to 135°.

Next, a consideration of the reason why the characteristic phenomenon occurs will be described.

Figure 13:
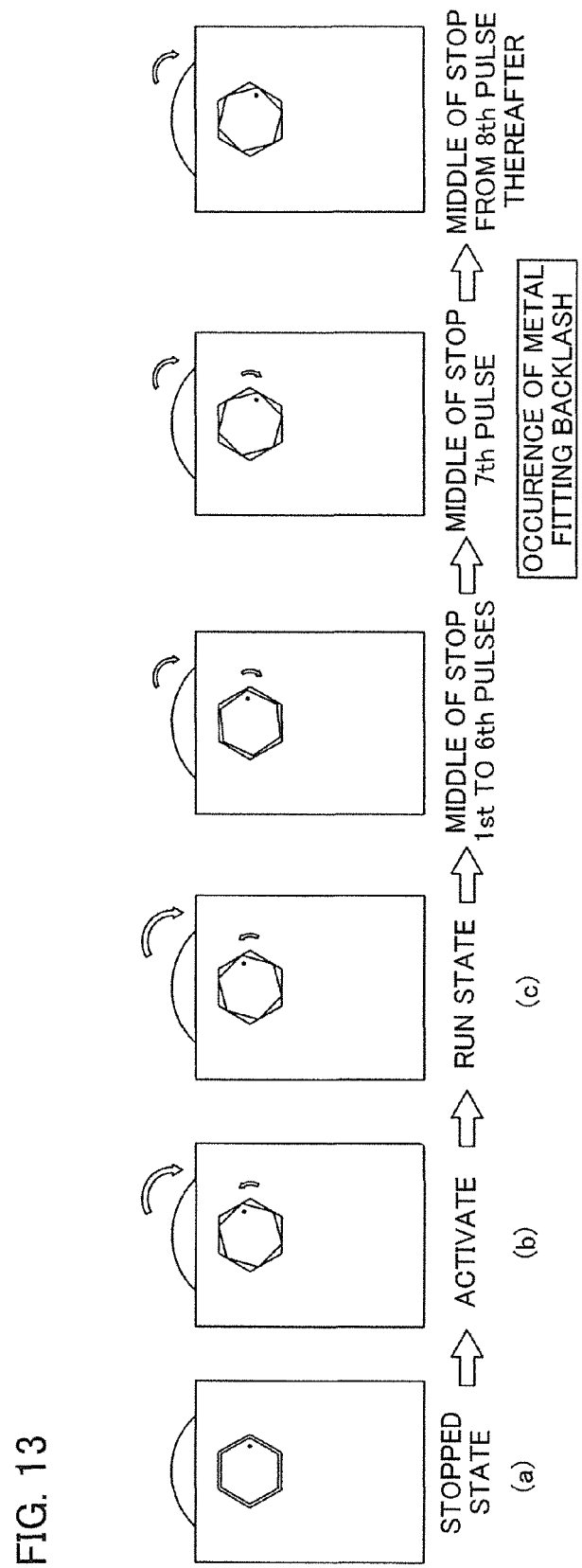
FIG. 13 is an explanatory diagram describing the principle of the occurrence of a characteristic phenomenon and a delay phenomenon.

When the motor-incorporating roller 5a is in a stopped state, the relationship between the hole 61 of the metal fitting 55 and the fixed shaft 56 is as illustrated by (a) in FIG. 13. The rotation angle position of the hexagon of the fixed shaft 56 is the same as the angle position of the hole 61.

On the other hand, when the motor-incorporating roller 5a is rotated in, for example, the clockwise direction, the fixed shaft 56 rotates in the counterclockwise direction by the reaction force thereof as illustrated by (b) and (c) in FIG. 13. As a result, the rotation angle position of the hexagon of the fixed shaft 56 is tilted by several degrees in the counterclockwise direction.

Then, when a STOP signal is transmitted to the motor-incorporating roller 5a, the roller body rotates in the clockwise direction by inertia and the fixed shaft 56 rotates in the clockwise direction along with the rotation of the roller body. As a result, the rotation angle position of the hexagon of the fixed shaft 56 is tilted by several degrees in the clockwise direction.

While the rotation angle position of the hexagon of the fixed shaft 56 is shifted from a state tilted by several degrees in the counterclockwise direction to a state tilted by several degrees in the clockwise direction, the roller body and the fixed shaft 56 simultaneously rotate for a moment, and the generation of a pulse at this point is delayed.

According to the experiment, the phenomenon of the delay of the pulse generation occurred between when a signal for stopping the motor-incorporating roller 5a was transmitted and when the motor-incorporating roller 5a came to a complete stop.

Figure 15:
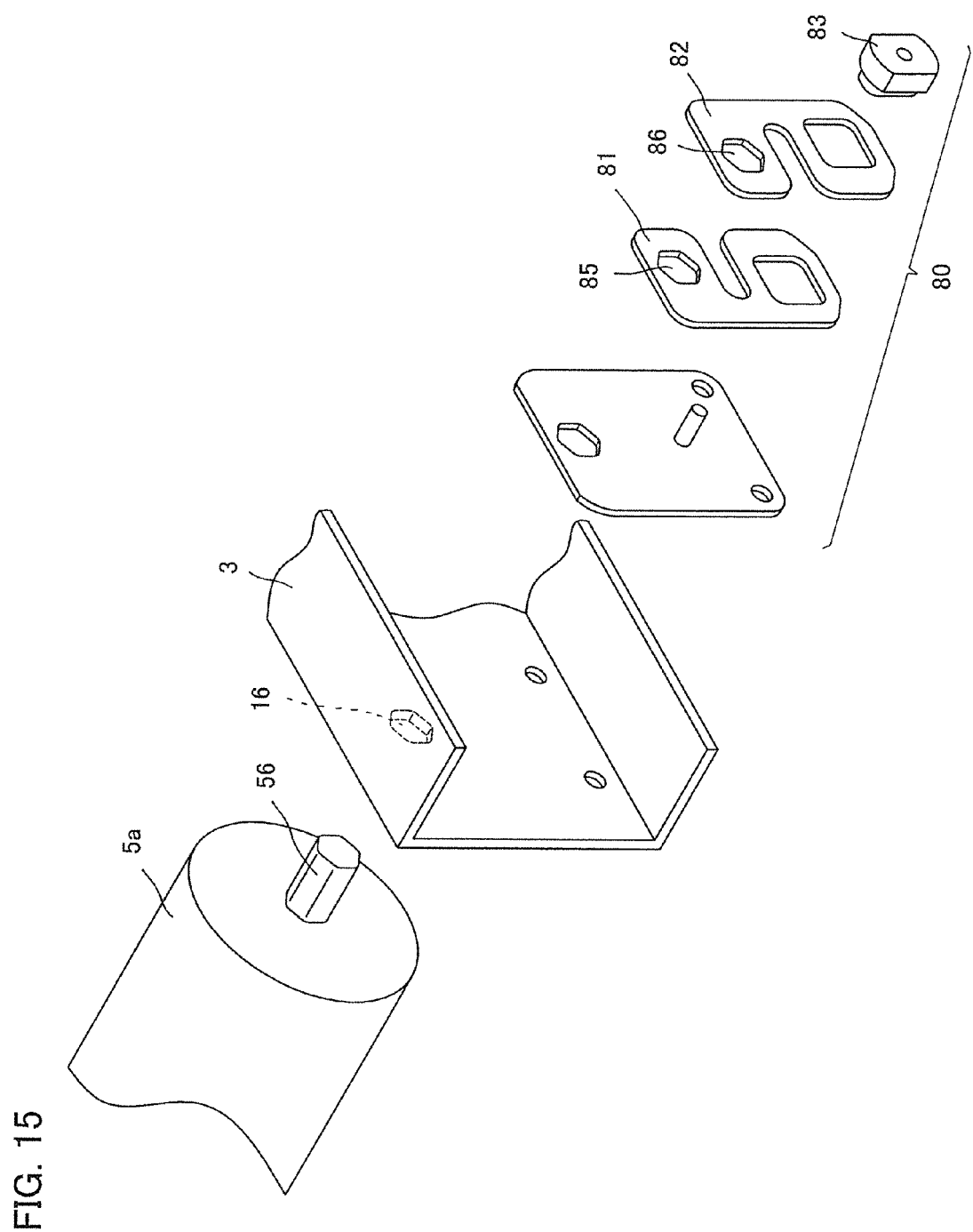
FIG. 15 is an exploded perspective view illustrating a modification of the metal fitting.
Figure 16:
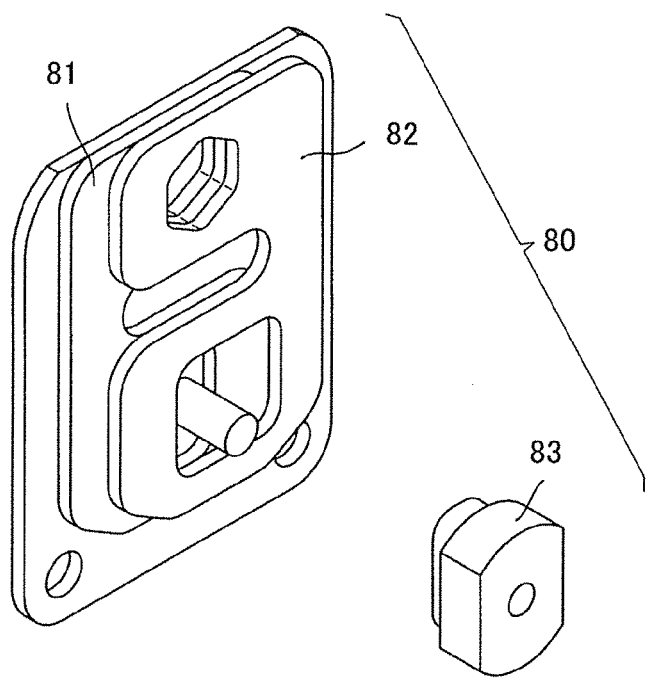
FIG. 16 is a perspective view illustrating a function of the metal fitting of FIG. 15 when a fixed shaft of the motor-incorporating roller is loosened.
Figure 17:
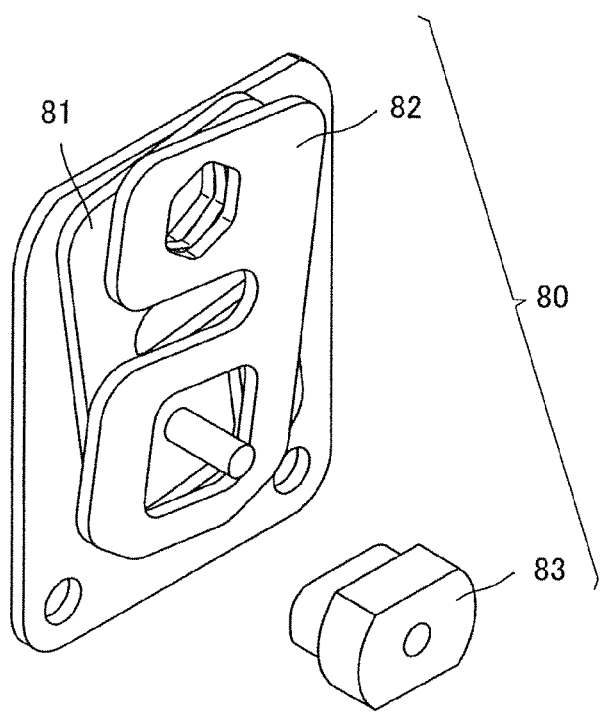
FIG. 17 is a perspective view illustrating the function of the metal fitting of FIG. 15 when the fixed shaft of the motor-incorporating roller is fastened.

Although, in the embodiment described above, the metal fitting 55 illustrated in FIGS. 6 and 7 is used, the metal fitting 55 may have any structure. For example, a metal fitting 80 as illustrated in FIGS. 15 to 17 may be used. In the metal fitting 80, two swing pieces 81 and 82 are allowed to swing by a cam 83 to rotate holes 85 and 86 of the swing pieces 81 and 82 to fasten the fixed shaft 56.

In the embodiment described above, the zone controller 10 is provided in each control zone. Alternatively, the present invention may also be applied to a roller conveyor that controls a plurality of control zones by a single zone controller.

Although, in the embodiment described above, the present invention is applied to the zone controller 10 of the roller conveyor 1, the controller itself may also be used in another device.

Figure 18:
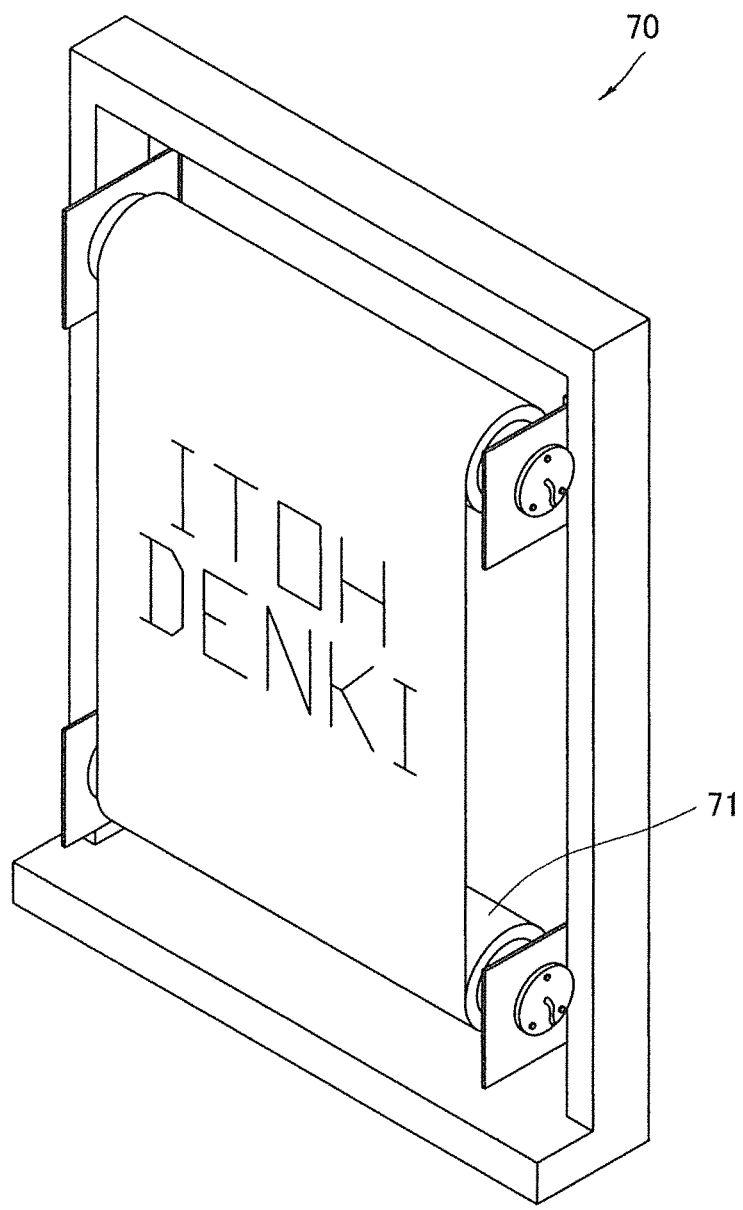
FIG. 18 is a perspective view of a scroll device.

Specifically, a motor-incorporating roller may be used as a drive pulley of a belt conveyor. Further, a motor-incorporating roller 71 may be employed in a winding machine or a scroll device 70 as illustrated in FIG. 18.

The present invention may be applied as a controller that controls a motor-incorporating roller used in these devices. The motor-incorporating roller 71 used in the winding machine or the scroll device 70 has low necessity of operating in cooperation with an adjacent device. Thus, when the controller of the present invention is employed in the winding machine or the scroll device 70, a function of preforming transmission/reception of a load presence signal or a driving state signal with an adjacent controller is not required.

In the embodiment described above, "the pulse reciprocation switching interval" is defined as "the pulse signal interval". Alternatively, an interval of the generation or the disappearance of pulse signals may be defined as "the pulse signal interval".

For example, in FIG. 8, the time t2 between the rise time T1 of the Hall element P and the rise time T3 of the Hall element G is measured and defined as "the pulse signal interval".

The invention claimed is:

1. A roller conveyor comprising:
   a frame;
   a plurality of rollers attached to the frame, at least one of the rollers being a motor-incorporating roller including therein a roller body and a motor that causes the roller body to rotate;
   a pulse signal generation unit that generates a pulse signal in accordance with rotation of a rotor of the motor-incorporating roller; and
   a failure detection function that detects abnormality of the roller conveyor,
   the failure detection function detecting a pulse signal interval when the rotation of the motor-incorporating roller is caused to be stopped by a signal from a controller and detecting occurrence of a delay phenomenon in which a maximum pulse signal interval becomes at least a predetermined interval before the motor-incorporating roller comes to stop.

2. The roller conveyor as defined in claim 1,
   wherein the roller conveyer monitors the pulse signal interval until the number of the generated pulse signal interval reaches the number smaller than the number of the pulse interval generated before the pulse signal stops by a predetermined number to determine whether the delay phenomenon has occurred during the monitored period.

3. The roller conveyor as defined in claim 1,
   wherein the roller conveyer monitors the pulse signal interval until the number of the generated pulse signal intervals reaches a certain number after energization to the motor-incorporating roller is stopped to determine whether the delay phenomenon has occurred during the monitored period.

4. The roller conveyor as defined in claim 1, further comprising a characteristic phenomenon detection function of detecting occurrence of a characteristic phenomenon in which the pulse signal temporarily extends the interval and then shortens the interval, and then comes to stop of generation.

5. The roller conveyor as defined in claim 1,
   wherein the roller conveyor is divided into a plurality of control zones,
   one or a plurality of the motor-incorporating rollers are provided in each of the control zones, and
   the roller conveyor comprises a controller for controlling the motor-incorporating rollers of each of the control zones or a plurality of the control zones.

6. The roller conveyor as defined in claim 1, further comprising a plurality of controllers and a host controller for the controllers,
   wherein information about the pulse signal interval is transmitted from each of the controllers to the host controller in accordance with an instruction of the host controller.

7. The roller conveyor as defined in claim 5,
wherein the controller includes:
an interval detection unit that detects the pulse signal interval; and
a selection unit that selects the maximum one of the pulse intervals detected by the interval detection unit, and
wherein information about the maximum interval is transmitted to a host controller to determine whether the delay phenomenon has occurred in the host controller.

8. The roller conveyor as defined in claim 1, further comprising an alarm unit that notifies generation of looseness in attachment of the motor-incorporating roller to the frame on the condition that the delay phenomenon has occurred.

9. The roller conveyor as defined in claim 8,
wherein an alarm content of the alarm unit changes depending on the degree of the delay phenomenon.

10. The roller conveyor as defined in claim 1,
wherein the failure detection function detects a switching interval from a rise or a fall of any pulse signal to a rise or a fall of another pulse signal as the pulse signal interval to detect occurrence of the delay phenomenon in which the pulse signal switching interval becomes a certain interval or more before the motor-incorporating roller comes to stop.

11. The roller conveyor as defined in claim 1,
wherein whether the delay phenomenon has occurred is determined by comparing any pulse signal interval nw with an immediately preceding pulse signal interval mw and by determining whether a difference between the pulse signal interval nw and the immediately preceding pulse signal interval mw is equal to or more than a threshold TS, and
when the motor-incorporating roller is rotated on the condition that there is no looseness in attachment of the motor-incorporating roller and a pulse signal interval immediately before power supply to the motor-incorporating roller is stopped is defined as a reference interval ts, the threshold TS is three to ten times the reference interval ts.

12. The roller conveyor as defined in claim 1,
wherein whether the delay phenomenon has occurred is determined by comparing any pulse signal interval nw with an immediately preceding pulse signal interval mw and by determining whether a difference between the pulse signal interval nw and the immediately preceding pulse signal interval mw is a predetermined ratio or more on the basis of the immediately preceding pulse signal interval mw or the specific pulse signal interval nw.

13. The roller conveyor as defined in claim 1,
wherein the rotor of the motor-incorporating roller has a permanent magnet and a plurality of poles,
wherein the roller conveyor comprises:
a plurality of signal generation units that detects approach/departure of the poles to generate a signal, several of the signal generation units simultaneously generating signals when the motor rotates; and
a pulse generation circuit that generates a pulse corresponding to each of the signal generation units in accordance with a signal corresponding to each of the signal generation units, and
wherein the roller conveyor detects the pulse signal interval without distinguishing which of the signal generation units generates the pulse signal interval.

14. A controller for controlling a motor-incorporating roller having a roller body and a brushless motor therein, the brushless motor including a signal generation unit that generates a signal in accordance with a rotation position of a rotor so as for the controller to switch current to be supplied to a stator of the brushless motor in accordance with the signal,
the controller comprising;
a pulse generation circuit that generates a pulse in accordance with a signal generated by the signal generation unit;
an interval detection unit that detects an interval of pulse signals generated by the pulse generation circuit;
a selection unit that selects a maximum one of the pulse intervals detected by the interval detection unit; and
a transmission unit that transmits information about the selected maximum interval to the outside that can be processed to identify an abnormality of a function of the motor-incorporating roller.

15. A method for detecting abnormality of a function of a machine,
the machine using a motor-incorporating roller including a roller body and a motor therein, the motor-incorporating roller rotating the roller body by rotation of the motor,
the method comprising:
generating a pulse signal in accordance with rotation of the motor in the motor-incorporating roller;
detecting a pulse signal interval when rotation of the motor-incorporating roller is caused to be stopped by a signal from a controller; and
determining abnormality of a function of the machine on the condition that the pulse signal interval reaches at least a predetermined maximum interval before the motor-incorporating roller comes to stop.

16. The method as defined in claim 15,
wherein the method monitors the pulse signal interval until the number of the generated pulse signal interval reaches the number smaller than the number of the pulse interval generated before the pulse signal stops by a predetermined number to determine whether the pulse signal interval becomes a certain interval or more before the motor-incorporating roller comes to stop has occurred during the monitored period.

17. The method as defined in claim 15,
wherein the method monitors the pulse signal interval until the number of the generated pulse signal intervals reaches a certain number after energization to the motor-incorporating roller is stopped to determine whether the pulse signal interval becomes a certain interval or more before the motor-incorporating roller comes to stop has occurred during the monitored period.

18. The method as defined in claim 15, further comprising:
detecting occurrence of a characteristic phenomenon in which the pulse signal temporarily extends the interval and then shortens the interval, and then comes to stop of generation.

19. The roller conveyor as defined in claim 6,
wherein the controller includes:
an interval detection unit that detects the pulse signal interval; and
a selection unit that selects the maximum one of the pulse intervals detected by the interval detection unit, and
wherein information about the selected maximum interval is transmitted to the host controller to determine whether the delay phenomenon has occurred in the host controller.

* * * * *